United States Patent
Sugiyo et al.

(10) Patent No.: US 12,424,655 B2
(45) Date of Patent: Sep. 23, 2025

(54) ALL-SOLID-STATE BATTERY, METHOD FOR MANUFACTURING SAME, AND PROCESSING DEVICE

(71) Applicant: KANADEVIA CORPORATION, Osaka (JP)

(72) Inventors: Takeshi Sugiyo, Osaka (JP); Hideyuki Fukui, Osaka (JP)

(73) Assignee: KANADEVIA CORPORATION, Osaka (JP)

( * ) Notice: Subject to any disclaimer, the term of this patent is extended or adjusted under 35 U.S.C. 154(b) by 224 days.

(21) Appl. No.: 16/958,461

(22) PCT Filed: Dec. 21, 2018

(86) PCT No.: PCT/JP2018/047234
§ 371 (c)(1),
(2) Date: Jun. 26, 2020

(87) PCT Pub. No.: WO2019/131503
PCT Pub. Date: Jul. 4, 2019

(65) Prior Publication Data
US 2021/0057777 A1 Feb. 25, 2021

(30) Foreign Application Priority Data
Dec. 28, 2017 (JP) .................................. 2017-254792

(51) Int. Cl.
*H01M 10/0562* (2010.01)
*H01M 10/0585* (2010.01)

(52) U.S. Cl.
CPC ... *H01M 10/0562* (2013.01); *H01M 10/0585* (2013.01)

(58) Field of Classification Search
CPC ..... H01M 10/0562; H01M 6/18; B32B 38/04; B32B 38/042; B32B 38/10; B26D 1/00
See application file for complete search history.

(56) References Cited

U.S. PATENT DOCUMENTS

| | | | |
|---|---|---|---|
| 6,030,421 A | 2/2000 | Gauthier et al. | |
| 2008/0032236 A1* | 2/2008 | Wallace | H01M 10/056 430/319 |

(Continued)

FOREIGN PATENT DOCUMENTS

| | | |
|---|---|---|
| CN | 101971407 A | 2/2011 |
| CN | 104752774 A | 7/2015 |

(Continued)

OTHER PUBLICATIONS

English translation of the International Search Report dated Feb. 26, 2019 issued in corresponding International Application No. PCT/JP2018/047234 (2 pgs.).

(Continued)

*Primary Examiner* — Tabassom Tadayyon Eslami
(74) *Attorney, Agent, or Firm* — Pillsbury Winthrop Shaw Pittman, LLP

(57) ABSTRACT

The present invention prevents edge collapse of an electrode layer of a laminated body included in an all-solid-state battery. A method of producing an all-solid-state battery includes: a laminated body forming step of forming a laminated body (310) including (i) a positive electrode layer (302), (ii) a negative electrode layer (304) having a polarity opposite of a polarity of the positive electrode layer (302); and (iii) a solid-electrolyte layer (303) disposed between the positive electrode layer (302) and the negative electrode layer (304); and a cutoff step of cutting off an outer peripheral edge of the laminated body (310) so as to form a laminated body containing a powder material.

3 Claims, 11 Drawing Sheets

(56) References Cited

U.S. PATENT DOCUMENTS

| | | |
|---|---|---|
| 2011/0311883 A1 | 12/2011 | Oukassi et al. |
| 2012/0115018 A1 | 5/2012 | Kawaoka et al. |
| 2015/0188195 A1 | 7/2015 | Matsushita |
| 2017/0144429 A1 | 5/2017 | Fukui et al. |
| 2018/0198169 A1 | 7/2018 | Fukui et al. |
| 2021/0075065 A1 | 3/2021 | Sera et al. |

FOREIGN PATENT DOCUMENTS

| | | | |
|---|---|---|---|
| CN | 106660358 A | | 5/2017 |
| CN | 107408729 | * | 11/2017 |
| EP | 0875952 | * | 11/1998 |
| EP | 3316382 | * | 2/2018 |
| EP | 3823075 A1 | | 5/2021 |
| JP | 2008-053103 A | | 3/2008 |
| JP | 2008053103 | * | 3/2008 |
| JP | 2009-544141 A | | 12/2009 |
| JP | 2011151029 | * | 8/2011 |
| JP | 2012-520552 A | | 9/2012 |
| JP | 2014-120372 A | | 6/2014 |
| JP | 2014-127260 | * | 7/2014 |
| JP | 2014-127260 A | | 7/2014 |
| JP | 2015-026563 A | | 2/2015 |
| JP | 2015-050153 A | | 3/2015 |
| JP | 2015-125893 A | | 7/2015 |
| JP | 2015-162353 A | | 9/2015 |
| WO | 2008/011061 A1 | | 1/2008 |
| WO | 2016/208271 A1 | | 4/2016 |
| WO | 2016/208271 | * | 12/2016 |
| WO | 2019/221010 A1 | | 11/2019 |
| WO | 2020/013295 A1 | | 1/2020 |

OTHER PUBLICATIONS

English translation of the International Preliminary Report on Patentability dated Jun. 30, 2020 issued in corresponding International Patent Application No. PCT/JP2018/047234 (12 pgs.).

Supplementary European Search Report dated Aug. 9, 2021, issued in corresponding European Patent Application No. 18895450.7 (19 pgs.).

Office Action dated Dec. 29, 2023, issued in corresponding Chinese Patent Application No. 201880083445.7 with English translation (20 pgs.).

* cited by examiner

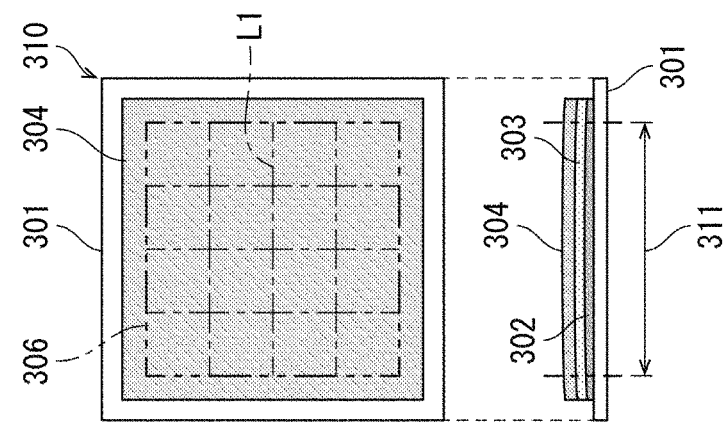
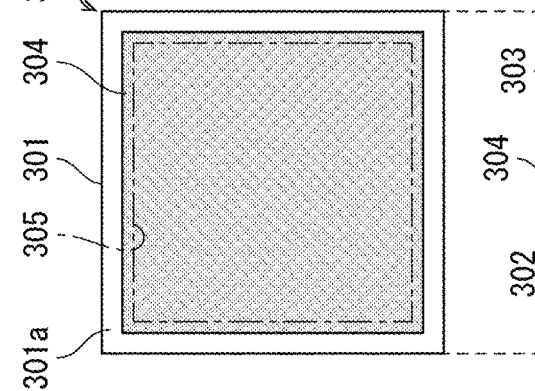
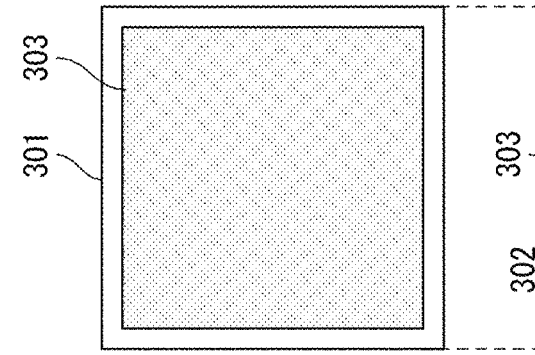
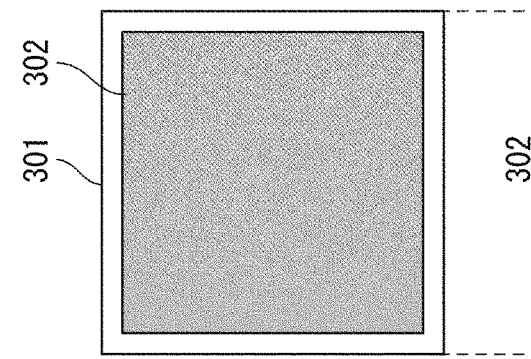

ALL-SOLID-STATE BATTERY, METHOD FOR MANUFACTURING SAME, AND PROCESSING DEVICE

CROSS REFERENCE TO RELATED APPLICATIONS

This application is the U.S. National Phase of PCT/JP2018/047234, FILED Dec. 21, 2018, which claims priority to Japanese Patent Application No. 2017-254792, the entire contents of which are incorporated herein by reference in entirety.

TECHNICAL FIELD

The present invention relates to an all-solid-state battery and a method of producing the all-solid-state battery.

BACKGROUND ART

A conventional all-solid-state battery includes (i) a laminated body (including a positive electrode layer, a solid-electrolyte layer, and a negative electrode layer) including a powder, (ii) a positive electrode current collector, and (iii) a negative electrode current collector. Because a laminated body is a powder film, there is a risk that powder collapse may occur particularly at an edge of the laminated body, and consequently the positive electrode active material and the negative electrode active material may be short-circuited.

Patent Literatures 1 and 2 each disclose enclosing a positive electrode layer with an insulator in order to prevent (i) edge collapse of a laminated body and (ii) a short circuit that occurs at the edge of a laminated body due to the edge collapse.

CITATION LIST

Patent Literature

[Patent Literature 1]
Japanese Patent Application Publication Tokukai No. 2015-125893 (Publication date: Jul. 6, 2015)
[Patent Literature 2]
Japanese Patent Application Publication Tokukai No. 2015-162353 (Publication date: Sep. 7, 2015)

SUMMARY OF INVENTION

Technical Problem

However, despite such a measure as enclosing a positive electrode layer with an insulator, it is still difficult to form a laminated body including a powder in such a manner that the laminated body is uniformly formed all over the surface including the edge of the laminated body. Therefore, even with the batteries disclosed in Patent Literatures 1 and 2, it is still not possible to sufficiently prevent edge collapse and/or a short circuit at the edge.

An object of an aspect of the present invention is to prevent edge collapse of a laminated body included in an all-solid-state battery.

Solution to Problem

In order to attain the object, an all-solid-state battery production method in accordance with an aspect of the present invention includes the step of: (a) forming a laminated body including a first electrode layer, a second electrode layer having a polarity opposite of a polarity of the first electrode layer, and a solid-electrolyte layer disposed between the first electrode layer and the second electrode layer; and (b) cutting off an outer peripheral edge of the laminated body, the laminated body containing a powder material.

In order to attain the object, an all-solid-state battery in accordance with an aspect of the present invention includes: a first electrode layer; a second electrode layer having a polarity opposite of a polarity of the first electrode layer; a solid-electrolyte layer disposed between the first electrode layer and the second electrode layer; and a support plate on which the first electrode layer, the second electrode layer, and the solid-electrolyte layer are stacked, an area of an interface between the first electrode layer and the solid-electrolyte layer being smaller than an area of an interface between the solid-electrolyte layer and the second electrode layer, and a side surface of the all-solid-state battery being inclined.

Advantageous Effects of Invention

With an aspect of the present invention, it is possible to prevent edge collapse of a laminated body included in an all-solid-state battery.

BRIEF DESCRIPTION OF DRAWINGS

FIG. 3A through FIG. 3D are illustrating steps involved in a first production method of producing the all-solid-state battery.

DESCRIPTION OF EMBODIMENTS

Embodiment 1

The following description will discuss Embodiment 1 of the present invention with reference to FIGS. 1 through 8.

Each Embodiment, including Embodiment 1, will discuss, as an example of an all-solid-state battery, an all-solid-state secondary battery which employs a lithium-ion-conductive solid electrolyte, that is, an all-solid-state lithium-ion secondary battery. Note, however, that the all-solid-state battery in accordance with each Embodiment of the present invention is of course not limited to an all-solid-state lithium-ion secondary battery.

Figure 1:
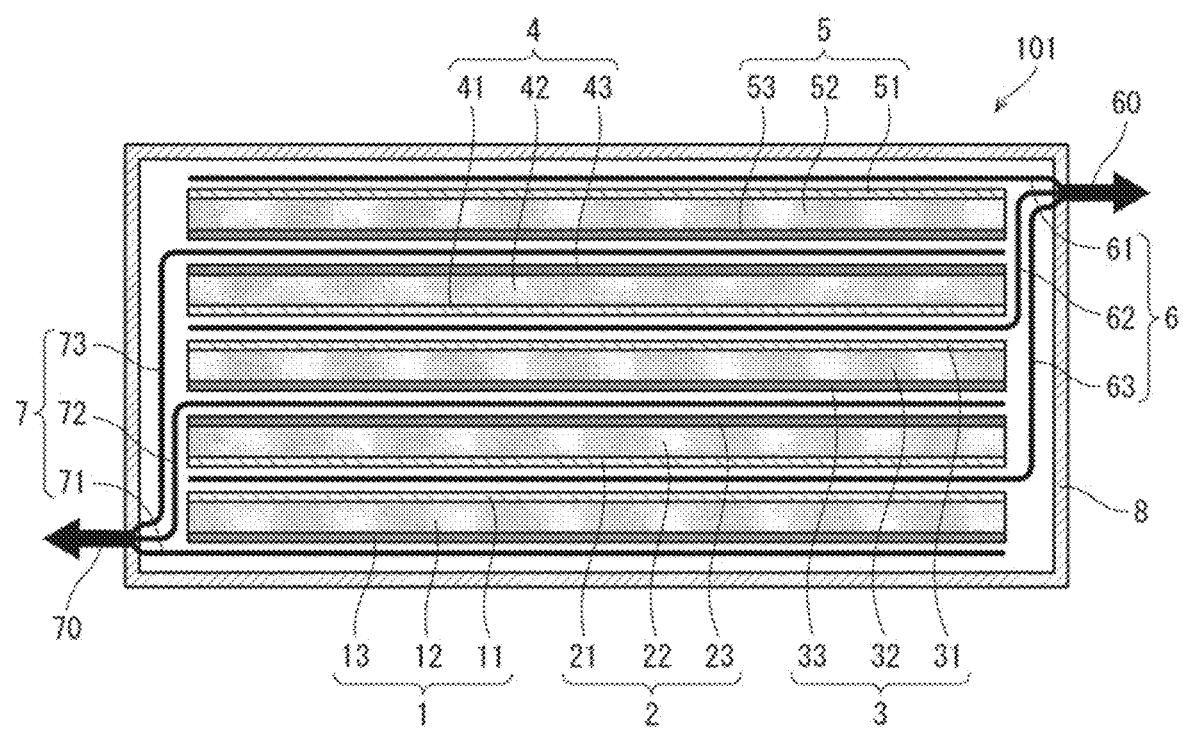
FIG. 1 is a cross-sectional view illustrating a structure of an all-solid-state battery in accordance with Embodiment 1 of the present invention.

FIG. 1 is a cross-sectional view illustrating a structure of an all-solid-state battery 101 in accordance with Embodiment 1.

Figure 8:
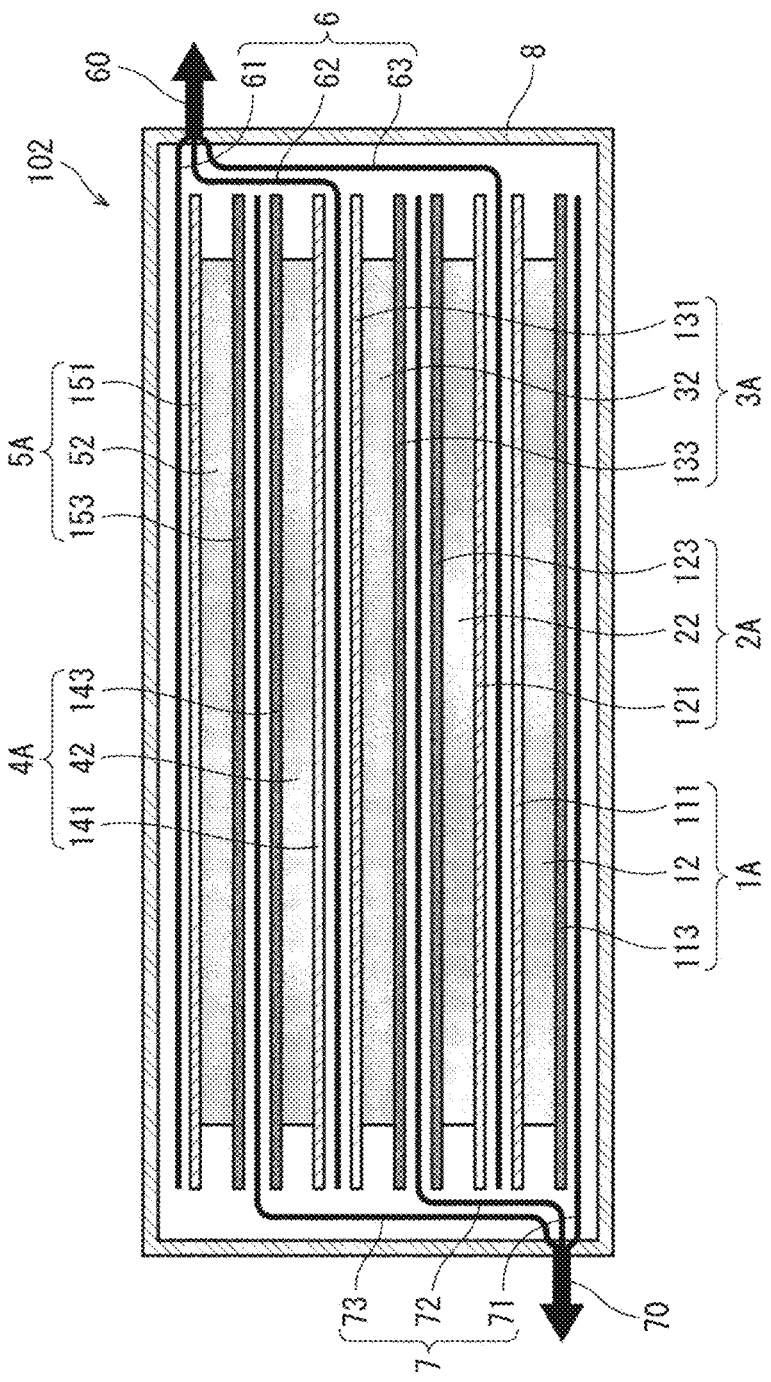
FIG. 8 is a cross-sectional view illustrating a structure of an all-solid-state battery in accordance with Comparative Example of Embodiment 1 of the present invention.

As illustrated in FIG. 1, the all-solid-state battery 101 includes all-solid-state batteries 1 through 5, a positive electrode current collector 6, a negative electrode current collector 7, and a package 8. The all-solid-state battery 101 is configured so that a plurality of all-solid-state batteries 1 through 5, each of which can function as an individual battery, are connected in parallel. Alternatively, the all-solid-state battery 101 can be configured so that the all-solid-state batteries 1 through 5 are connected in series. Although, for convenience, the all-solid-state batteries 1 through 5, the positive electrode current collector 6, and the negative electrode current collector 7 are illustrated in FIG. 1 so as to be spaced from each other, adjacent ones of them are in contact with each other. FIG. 8 (later described) illustrates these members in the same manner as FIG. 1.

The package 8 is a housing in the shape of a box including the all-solid-state batteries 1 through 5 therein.

The all-solid-state battery 1, the all-solid-state battery 2, the all-solid-state battery 3, the all-solid-state battery 4, and the all-solid-state battery 5 are arranged in this order from a negative-electrode side.

The all-solid-state battery 1 is configured so that a positive electrode current collector 11, a laminated body 12, and a negative electrode current collector 13 are stacked in this order.

The all-solid-state battery 2 is configured so that a positive electrode current collector 21, a laminated body 22, and a negative electrode current collector 23 are stacked in this order.

The all-solid-state battery 3 is configured so that a positive electrode current collector 31, a laminated body 32, and a negative electrode current collector 33 are stacked in this order.

The all-solid-state battery 4 is configured so that a positive electrode current collector 41, a laminated body 42, and a negative electrode current collector 43 are stacked in this order.

The all-solid-state battery 5 is configured so that a positive electrode current collector 51, a laminated body 52, and a negative electrode current collector 53 are stacked in this order.

The all-solid-state battery 1 is provided so that the negative electrode current collector 13 of the all-solid-state battery 1 is positioned on the negative-electrode side. The all-solid-state battery 5 is provided so that the positive electrode current collector 51 of the all-solid-state battery 5 is positioned on a positive-electrode side. The all-solid-state batteries 1 and 2 are provided so that the positive electrode current collector 11 of the all-solid-state battery 1 and the positive electrode current collector 21 of the all-solid-state battery 2 face each other. The all-solid-state batteries 2 and 3 are provided so that the negative electrode current collector 23 of the all-solid-state battery 2 and the negative electrode current collector 33 of the all-solid-state battery 3 face each other. The all-solid-state batteries 3 and 4 are provided so that the positive electrode current collector 31 of the all-solid-state battery 3 and the positive electrode current collector 41 of the all-solid-state battery 4 face each other. The all-solid-state batteries 4 and 5 are provided so that the negative electrode current collector 43 of the all-solid-state battery 4 and the negative electrode current collector 53 of the all-solid-state battery 5 face each other.

The planar shape of each of the all-solid-state batteries 1 through 5 is a quadrilateral shape (e.g. square). However, the shape is not limited to a quadrilateral shape, provided that the all-solid-state batteries 1 through 5 can be contained in the package 8. For example, the planar shape of each of the all-solid-state batteries 1 through 5 can be a circular shape, a polygonal shape, or a shape composed of a straight line and a curved line. Note, however, that the all-solid-state batteries 1 through 5 are ordinarily formed so as to have an identical planar shape and an identical size (area).

Each of the laminated bodies 12, 22, 32, 42, and 52 is a structure in which the following layers are laminated: (i) a positive electrode layer (first electrode layer), (ii) a negative electrode (second electrode layer) having a polarity opposite of that of the positive electrode layer, and (iii) a solid-electrolyte layer disposed between the positive electrode layer and the negative electrode layer.

The positive electrode layer is made of a composite material (mixture) of a positive electrode active material and a solid electrolyte or is alternatively made of a positive electrode active material alone. A weight ratio between the positive electrode active material and the solid electrolyte in the composite material is, for example, 7:3. The positive electrode active material can be a positive electrode active material which is ordinarily used in the field of all-solid-state batteries. Examples of the positive electrode active material encompass lithium-containing oxides (for example, lithium cobalt oxide ($LiCoO_2$), lithium nickel oxides ($LiNiO_2$), and lithium manganese oxides (such as $LiMnO_2$)).

The negative electrode layer is made of a composite material (mixture) of a negative electrode active material and a solid electrolyte or is alternatively made of a negative electrode active material alone. A weight ratio between the negative electrode active material and the solid electrolyte in the composite material is, for example, 6:4. The negative electrode active material can be a negative electrode active material which is ordinarily used in the field of all-solid-state batteries. Examples of the negative electrode active material, which can be used regardless of their forms such as a powder form or a foil form, encompass graphite (such as natural graphite and artificial graphite), carbon materials (such as a graphite carbon fiber and a resin baked carbon), tin, lithium, oxides, sulfides, nitrides, and alloys.

The solid electrolyte to be used for any of the positive electrode layer, the solid-electrolyte layer, and the negative electrode layer is a material which is ordinarily used in the field of lithium-ion batteries. Examples of such a solid electrolyte encompass (i) organic compounds, (ii) inorganic compounds, and (iii) materials composed of both organic compounds and inorganic compounds. Among the inorganic compounds, sulfides such as $Li_2S$—$P_2S_5$ are superior in to other inorganic compounds in terms of ion conductivity.

There are no particular limitations on a method of mixing the positive electrode mixture and the negative electrode mixture. According to Embodiment 1, all of mixtures are prepared with use of a ball mill.

The positive electrode current collector 6 includes the positive electrode current collectors 61 through 63. The positive electrode current collector 61 is provided between an inner surface on the positive-electrode side of the package 8 and the positive electrode current collector 51 of the all-solid-state battery 5 so as to be in contact with the positive electrode current collector 51. The positive electrode current collector 62 is provided between the positive electrode current collector 31 of the all-solid-state battery 3 and the positive electrode current collector 41 of the all-solid-state battery 4 so as to be in contact with both the positive electrode current collector 31 and the positive electrode current collector 41. The positive electrode current collector 63 is provided between the positive electrode current collector 11 of the all-solid-state battery 1 and the positive electrode current collector 21 of the all-solid-state battery 2 so as to be in contact with both the positive electrode current collector 11 and the positive electrode current collector 21. To the edges of the positive electrode current collectors 61 through 63, a positive electrode terminal 60 is connected. The positive electrode terminal 60 is provided so as to be exposed at a part of the package 8, for example, at a part of the side surface of the package 8 in the vicinity of one edge side of the all-solid-state battery 5. This allows the positive electrode current collector 6 to be electrically connected to a certain outside point.

The negative electrode current collector 7 includes the negative electrode current collectors 71 through 73. The negative electrode current collector 71 is provided between an inner surface on the negative-electrode side of the package 8 and the negative electrode current collector 13 of the all-solid-state battery 1 so as to be in contact with the negative electrode current collector 13. The negative electrode current collector 72 is provided between the negative electrode current collector 23 of the all-solid-state battery 2 and the negative electrode current collector 33 of the all-solid-state battery 3 so as to be in contact with both the negative electrode current collector 23 and the negative electrode current collector 33. The negative electrode current collector 73 is provided between the negative electrode current collector 43 of the all-solid-state battery 4 and the negative electrode current collector 53 of the all-solid-state battery 5 so as to be in contact with both the negative electrode current collector 43 and the negative electrode current collector 53. To the edges of the negative electrode current collectors 71 through 73, a negative electrode terminal 70 is connected. The negative electrode terminal 70 is provided so as to be exposed at a part of the package 8, for example, at a part of the side surface of the package 8 in the vicinity of one edge side (side opposite a side toward the positive electrode terminal 60) of the all-solid-state battery 1. This allows the negative electrode current collector 7 to be electrically connected to a certain outside point.

Note that according to the structure illustrated in FIG. 1, the positive electrode terminal 60 and the negative electrode terminal 70 are provided at respective sides of the package 8 for ease of viewing. However, the positions at which the positive electrode terminal 60 and the negative electrode terminal 70 are to be provided are not limited to such positions, but can be any positions of the package 8. In addition, positions at which to perform power collection with use of the positive electrode terminal 60 and the negative electrode terminal 70 are not limited to one position of the positive electrode and one position of the negative electrode, respectively. It is possible to perform power collection at a plurality of positions of each of the positive and negative electrodes.

Although not illustrated, the package 8 (at least the inner surfaces) is preferably formed so as to be insulating. Alternatively, an insulator is preferably (i) inserted between the package 8 and the all-solid-state batteries 1 through 5 or (ii) inserted between (a) the package 8 and (b) the positive electrode current collectors 61 through 63 and the negative electrode current collectors 71 through 73.

Each of the positive electrode current collector 6, the negative electrode current collector 7, the positive electrode terminal 60, and the negative electrode terminal 70 is made of copper, magnesium, stainless steel, titanium, iron, cobalt, nickel, zinc, aluminum, germanium, indium, lithium, tin, or an alloy of any of these materials. Each of the positive electrode current collectors 61 through 63 and the negative electrode current collectors 71 through 73 is in the form of a plate, foil, a powder, a film, or the like. According to Embodiment 1, the positive electrode current collectors 61 through 63 are each from an aluminum foil, and the negative electrode current collectors 71 through 73 are each formed from a copper foil. The positive electrode current collector 6, the negative electrode current collector 7, the positive electrode terminal 60, and the negative electrode terminal 70 are each preferably made of a material which has toughness and rigidity to a certain extent.

As described above, the positive electrode current collectors 11, 21, 31, 41, and 51 are connected to each other via the positive electrode terminal 60, and the negative electrode current collectors 13, 23, 33, 43, and 53 are connected to each other via the negative electrode terminal 70. This causes the all-solid-state batteries 1 through 5 to be connected in parallel.

Note that although the all-solid-state battery 101 in accordance with Embodiment 1 includes the all-solid-state batteries 1 through 5, the number of all-solid-state batteries is not limited to 5 (i.e. 5 layers). Note also that the all-solid-state battery 101 is a structure in which an odd number of layers, that is, 5 layers of the all-solid-state batteries 1 through 5, are stacked. Alternatively, the all-solid-state battery 101 can be a structure in which an even number of all-solid-state batteries (i.e. even number of layers) are stacked.

Next, production of the all-solid-state battery 101 configured as described above will be described.

Figure 2:
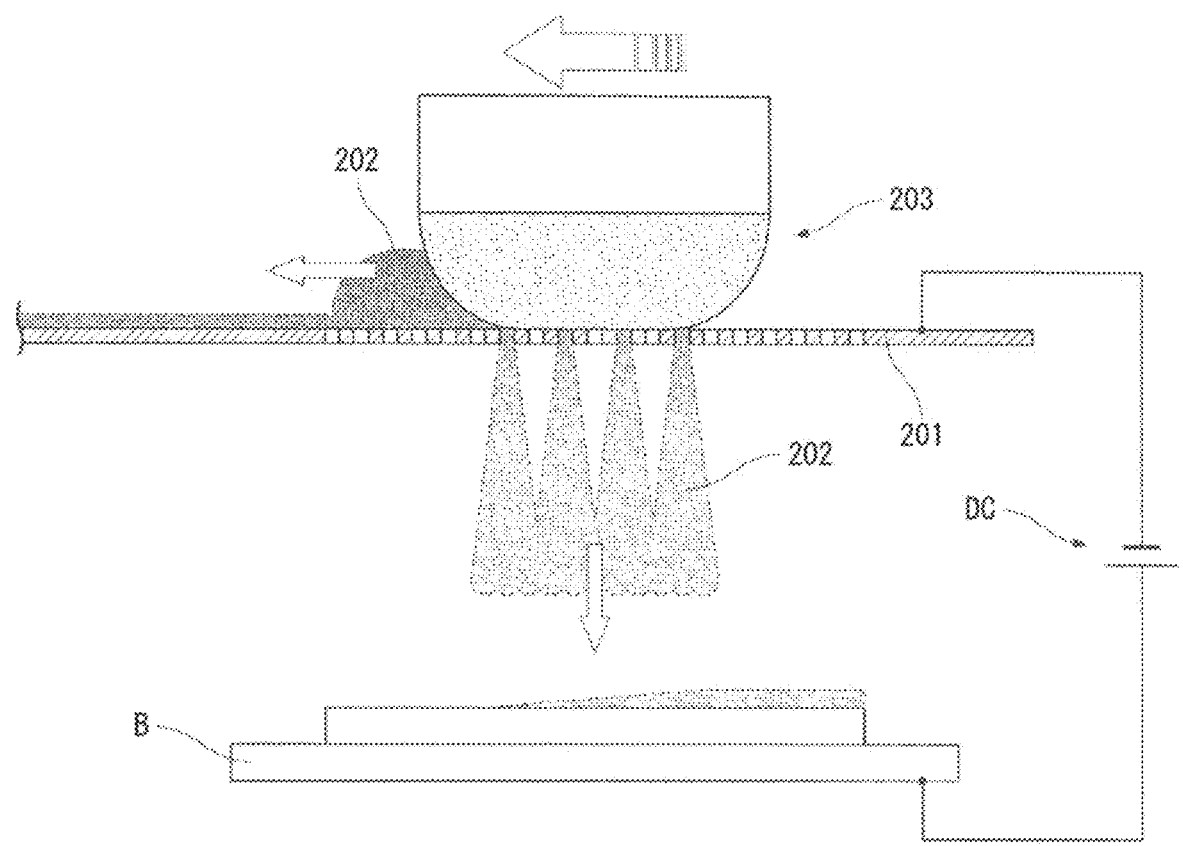
FIG. 2 is a view illustrating a method of forming a laminated body of an all-solid-state battery in accordance with each Embodiment.

FIG. 2 is a view illustrating a method of forming the laminated bodies 12, 22, 32, 42, and 52 of the all-solid-state battery 101 in accordance with Embodiment 1 of the present invention. The laminated bodies 12, 22, 32, 42, and 52 can be formed by a publicly known powder film forming method in which an electrostatic force is used (for example, electrostatic coating or an electrostatic screen film forming method (printing method)), as necessary. The following description will discuss a method of forming the laminated bodies 12, 22, 32, 42, and 52 by the electrostatic screen film forming method. Note that laminated bodies of all-solid-state battery in accordance with Embodiment 2 described later are also formed by the following method.

First, the laminated bodies 12, 22, 32, 42, and 52 are prepared by the electrostatic screen film forming method.

In the electrostatic screen film forming method employed in Embodiment 1, a device illustrated in FIG. 2 is used. The device includes a screen 201 and a substrate B. The screen 201 is a porous screen. The substrate B is a table on which a printed object, which is an object on which a film is to be formed, is placed. A negative electrode of a direct current power supply DC is connected to the screen 201, and a positive electrode of the direct current power supply DC is connected to the substrate B. Note that the positive electrode of the direct current power supply DC can be connected to the screen 201, and the negative electrode of the direct current power supply DC can be connected to the substrate B. It is not always necessary that one of the screen 201 and the substrate B be connected to the positive electrode and the other be connected to the negative electrode, provided that an electric potential difference occurs between the screen 201 and the printed object. One of the screen 201 and the substrate B can be set at a ground (earth) potential.

The screen 201 can be, for example, a commercially available mesh for screen printing. By altering an opening shape of the mesh as appropriate, it is possible to form a powder into any shape. In Embodiment 1, a mesh is employed which has a mesh count of 300/inch, a wire diameter of 30 µm, and openings of 55 µm. The mesh can be made of any material, provided that the material is electrically conducive. The mesh employed in Embodiment 1 is a typical SUS mesh.

Note that the mesh count, the wire diameter, and the openings, the material, and the like of the mesh used as the screen 201 are preferably selected as appropriate depending on the powder or an environment.

In such a device, by rubbing a powder 202 into the screen 201 with use of a rubbing member 203, the powder 202 is brought into contact with the screen 201. This causes the powder 202 to be electrically charged. The powder 202 thus electrically charged falls through the screen 201 and adheres to the printed object by electrostatic induction. This is how the positive electrode layer, the solid-electrolyte layer, and the negative electrode layer of each of the laminated bodies 12, 22, 32, 42, and 52 are formed.

With use of a device 2 illustrated in FIG. 2, the step of forming the positive electrode layer on the support plate is first carried out in forming the layers. The support plate supports the substrate, the current collectors, and the laminated bodies. Alternatively, the support plate can serve as the substrate or the current collectors. Note that a distance between the screen 201 and the substrate B is set to 10 mm, and a voltage of 5 kV is applied.

Next, the solid-electrolyte layer is formed on the positive electrode layer by a method identical to the method by which the positive electrode layer was formed.

Finally, the negative electrode layer is formed on the solid-electrolyte layer by a method identical to the method by which the positive electrode layer was formed.

Note that the order in which these layers are formed is not limited to the above order, and any one of these layers can be formed first. In addition, as necessary, the positive electrode layer, the solid-electrolyte layer, and the negative electrode layer can be individually formed and then each pressurized so as to be flat.

Then, by pressurizing the laminated body in which the three layers are stacked on the support plate, it is possible to obtain a laminated body in which the three layers are integrated.

In the pressurization of the laminated body, it is desirable to carry out pre-pressurization with respect to each layer under a reduced-pressure environment so that gas and/or a void remaining in each of the layers formed as powder layers is/are eliminated in advance. In the pre-pressurization, a pressure of 11.6 kN is applied to each layer for 3 seconds.

Next, main pressurization is carried out with respect to the laminated body. In the main pressurization, a pressure of several t/cm$^2$ is applied to the laminated body for approximately several seconds to several tens of seconds. In the main pressurization, pressurization can be carried out while the negative electrode current collector is stacked on the laminated body.

In each of the laminated bodies compressed by the above pressurization, the positive electrode layer, the solid-electrolyte layer, and negative electrode layer are firmly integrated. In addition, the positive electrode layer, the solid-electrolyte layer, and the negative electrode layer are formed so as to be as thin as approximately several tens of µm to a hundred and several tens of µm. In addition, the total thickness of the layers together is as thin as approximately 100 µm through 400 µm.

According to Embodiment 1, however, the weight of each layer, the thickness of each layer, and the weight ratio between the layers in the laminated body are not limited to any certain ranges. Note also that the ratio of the thickness of the negative electrode layer to the thickness of the positive electrode layer is preferably not less than 1.0.

Furthermore, by cutting off an outer peripheral edges of the laminated body obtained through the pressurization treatment, each of the laminated bodies 12, 22, 32, 42, and 52 is obtained.

Figure 5:
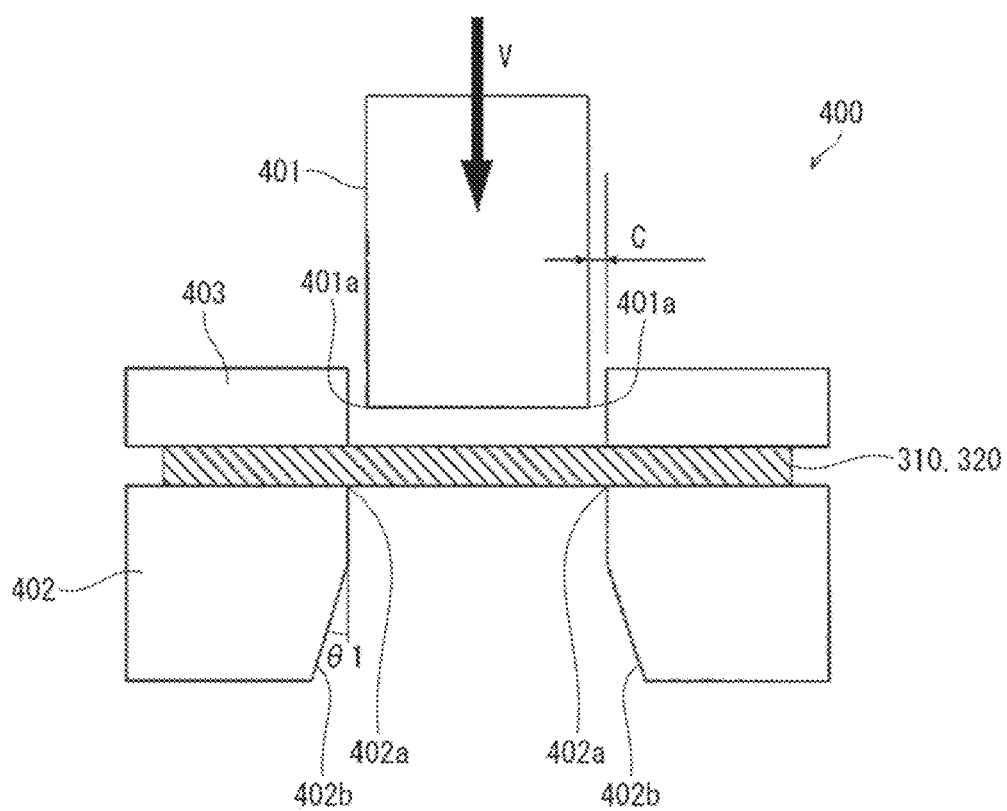
FIG. 5 is a view illustrating a precision punching device used in production of the all-solid-state battery.
Figure 6:
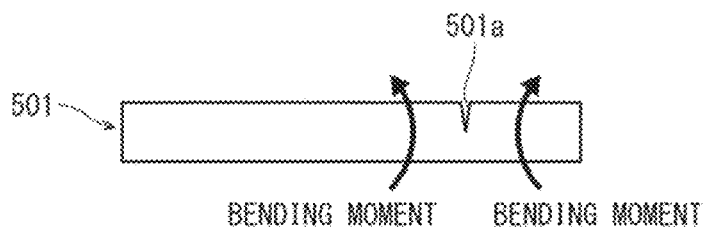
FIG. 6 is a view showing that an outer peripheral edge is cut out, by dividing by use of a chocolate break method, from a laminated body in production of the all-solid-state battery.
Figure 7:
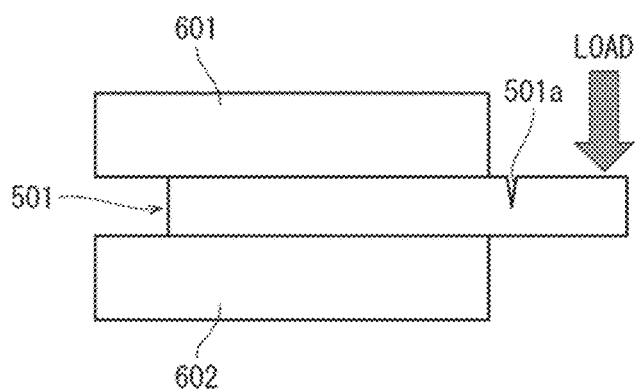
FIG. 7 is a view showing that an outer peripheral edge is cut out, by another dividing by use of a chocolate break method, from a laminated body in production of the all-solid-state battery.

Preparation of the laminated body will be described in more detail. FIG. 3A through FIG. 3D are views illustrating steps involved in a first production method of producing the all-solid-state battery 101. FIG. 4A through 4D are views illustrating steps involved in a second production method of producing the all-solid-state battery 101. FIGS. 3A through 3D and 4A through 4D show each step in a plan view and a side view. FIG. 5 is a view illustrating a precision punching device used in production of the all-solid-state battery 101. FIG. 6 is a view showing that an outer peripheral edge is cut off, by dividing by use of a chocolate break method, from a laminated body 501 in production of the all-solid-state battery 101. FIG. 7 is a view showing that an outer peripheral edge is cut off, by another dividing by use of a chocolate break method, from the laminated body 501 in production of the all-solid-state battery 101.

As illustrated in FIG. 3A, in the first production method, a positive electrode layer 302 is formed, with use of the device illustrated in FIG. 2, to have a square shape on a support plate 301 (support plate) having a square shape. In this step, the positive electrode layer 302 is formed so that (i) the square shape of the positive electrode layer 302 has an area smaller than that of the support plate 301 and (ii) the outer peripheral edges of the positive electrode layer 302 are positioned further inside than the outer peripheral edges of the support plate 301 by a certain distance. In this step, the positive electrode layer 302 is pressurized as necessary.

Next, as illustrated in FIG. 3B, a solid-electrolyte layer 303 is formed on the positive electrode layer 302 so that the solid-electrolyte layer 303 has a shape and a size identical to those of the positive electrode layer 302. In this step, the solid-electrolyte layer 303 is formed so that the outer peripheral edges of the solid-electrolyte layer 303 overlap the outer peripheral edges of the positive electrode layer 302. In this step, the solid-electrolyte layer 303 is pressurized as necessary.

Furthermore, as illustrated in FIG. 3C, a negative electrode layer 304 is formed on the solid-electrolyte layer 303 so that the negative electrode layer 304 has a shape and a size identical to those of the positive electrode layer 302 and of the solid-electrolyte layer 303. In this step, the negative electrode layer 304 is formed so that the outer peripheral edges of the negative electrode layer 304 overlap the outer peripheral edges of the solid-electrolyte layer 303. The negative electrode layer 304 is pressurized as necessary.

In this way, a laminated body 310 is prepared so that the positive electrode layer 302, the solid-electrolyte layer 303, and the negative electrode layer 304 are stacked on the support plate 301 (laminated body forming step). Furthermore, by pressurizing the laminated body 310 as described above (pre-pressurization and main pressurization), it is possible to obtain a laminated body 310 in which the support plate 301, the positive electrode layer 302, the solid-electrolyte layer 303, and the negative electrode layer 304 are firmly integrated.

Then, as illustrated in FIG. 3D, by cutting off outer peripheral edges from the laminated body 310 according to a cutoff shape 306 having a square shape indicated by the two-dot chain lines (cutoff step), a laminated body 311 is obtained so that unnecessary portions are removed. By removing the support plate 301 from the laminated body 311, each of the laminated bodies 12, 22, 32, 42, and 52 is obtained. In the cutoff step, a cutout portion can be divided into a plurality of portions according to dividing lines L1 indicated by the dashed dotted lines. This allows a plurality of divided laminated bodies to be obtained. Such divided laminated bodies can be used as the laminated bodies 12, 22, 32, 42, and 52.

According to the first production method, the laminated body 310 is formed so that interfaces between the positive electrode layer 302, the solid-electrolyte layer 303, and the negative electrode layer 304 have an identical area. In this state, due to alignment accuracy, formation accuracy, uneven pressurization between edges and the center part, or the like during formation of each layer, there is a high possibility that (i) powder collapse may occur at the edge of the laminated body 311 and/or (ii) a short circuit may occur between (a) a positive electrode active material of which a positive electrode layer is made and (b) a negative electrode active material of which a negative electrode layer is made.

Therefore, a peripheral portion (portion further outside than the cutoff shape 306) of the laminated body 310 is cut off. In the laminated body 311 thus obtained, the positive electrode layer, the solid-electrolyte layer, and the negative electrode layer are a portion having a dense structure uniformly compressed by pressurization. This causes the outer peripheral edges to be unlikely to collapse. It is therefore possible to prevent (i) edge collapse at the outer peripheral edges of the laminated body 311 and (ii) a short circuit.

Figure 4A:
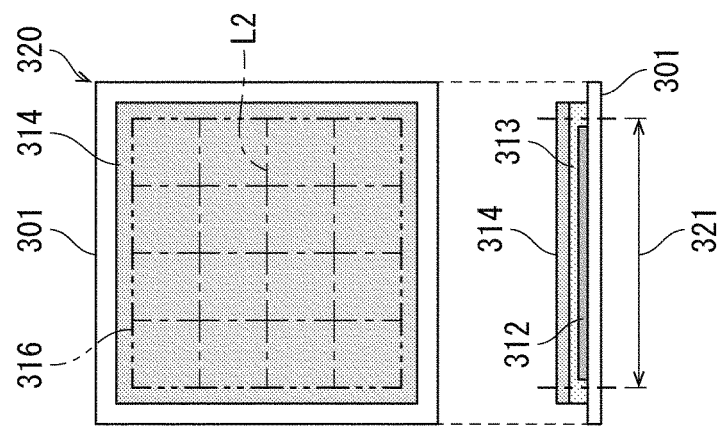
FIG. 4A through FIG. 4D are illustrating steps involved in a second production method of producing the all-solid-state battery.

As illustrated in FIG. 4A, in the second production method, a positive electrode layer 312 (first electrode layer) is formed, with use of the device illustrated in FIG. 2, to have a square shape on a support plate 301 having a square shape. In this step, the positive electrode layer 312 is formed so that (i) the square shape of the positive electrode layer 312 has an area smaller than that of the support plate 301 and, further, smaller than that of the above-described positive electrode layer 312 and (ii) the outer peripheral edges of the positive electrode layer 312 are positioned further inside than the outer peripheral edges of the support plate 301 by a certain distance. In this step, the positive electrode layer 312 is pressurized as necessary.

Figure 4B:
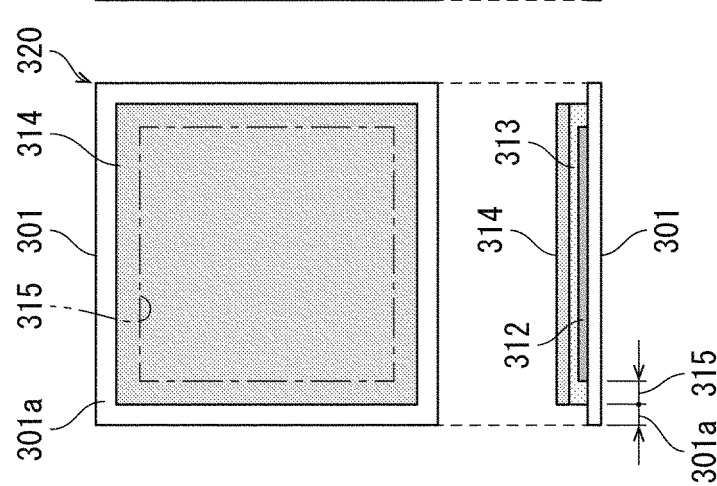

Next, as illustrated in FIG. 4B, the solid-electrolyte layer 313 is formed on the positive electrode layer 312 so that the solid-electrolyte layer 313 has (i) a shape identical to that of the positive electrode layer 312 and (ii) a size larger than that of the positive electrode layer 312. In this step, the solid-electrolyte layer 313 is formed so that the outer peripheral edges of the solid-electrolyte layer 313 are positioned further outside than the outer peripheral edges of the positive electrode layer 312-302 so as to cover the entire positive electrode layer 312. In this step, the solid-electrolyte layer 313 is pressurized as necessary.

Figure 4C:
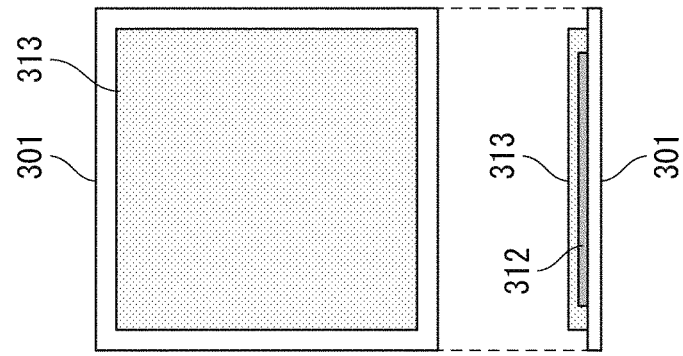

Furthermore, as illustrated in FIG. 4C, the negative electrode layer 314 is formed on the solid-electrolyte layer 313 so that the negative electrode layer 314 has a planar shape and a planar size identical to those of the solid-electrolyte layer 313. In this step, the negative electrode layer 314 is formed so that the outer peripheral edges of the negative electrode layer 314 overlap the outer peripheral edges of the solid-electrolyte layer 313. Alternatively, although not illustrated, the negative electrode layer 314 can be formed so that the outer peripheral edges of the negative electrode layer 314 are positioned between the outer peripheral edges of the positive electrode layer 312 and the outer peripheral edges of the solid-electrolyte layer 313. In this step, the negative electrode layer 314 is pressurized as necessary.

In this way, a laminated body 320 is prepared so that the positive electrode layer 312, the solid-electrolyte layer 313, and the negative electrode layer 314 are stacked on the support plate 301 (laminated body forming step). Furthermore, by pressurizing the laminated body 320 as described above, it is possible to obtain a laminated body 320 in which the support plate 301, the positive electrode layer 312, the solid-electrolyte layer 313, and the negative electrode layer 314 are firmly integrated.

Figure 4D:
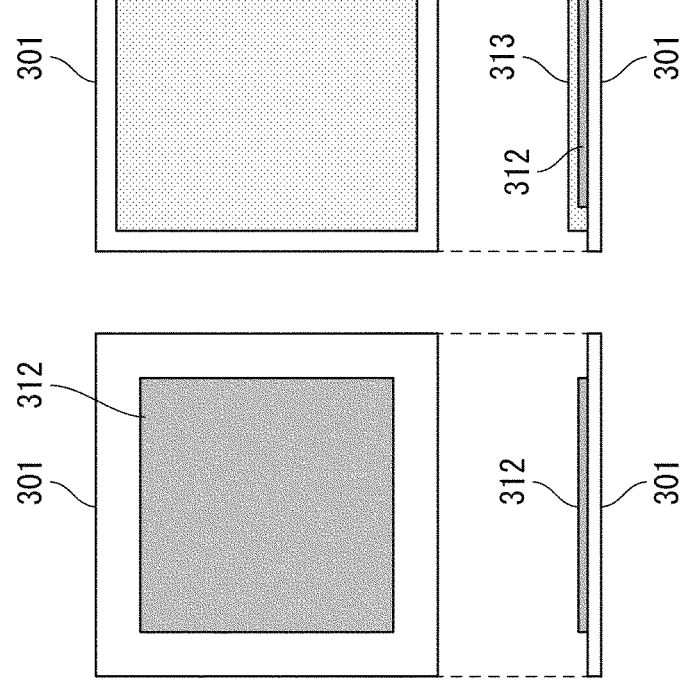

Then, as illustrated in FIG. 4D, by cutting off outer peripheral edges from the laminated body 320 according to a cutoff shape 316 having a square shape indicated by the two-dot chain lines (cutoff step), a laminated body 321 is obtained so that unnecessary portions are removed. The cutoff shape 316 is positioned (i) further inside than the outer peripheral edges of each of the support plate 301, the solid-electrolyte layer 313, and the negative electrode layer 314 and (ii) outside the outer peripheral edges of the positive electrode layer 312 (in a region in which the positive electrode layer 312 is not present). This laminated body 321 is used as each of the laminated bodies 12, 22, 32, 42, and 52 to which the positive electrode current collectors 11, 21, 31, 41, and 51 are included, respectively. In the cutoff step, a portion to be cut out can be divided into a plurality of portions according to dividing lines L2 indicated by the dashed dotted lines. This allows a plurality of divided laminated bodies to be obtained. Such divided laminated bodies can be used as the laminated bodies 12, 22, 32, 42, and 52.

According to the laminated body 321 thus obtained, (i) a top surface of the positive electrode layer has the smallest area, and a top surface of the solid-electrolyte layer has the largest area or (ii) the top surface of the positive electrode layer has the smallest area, and the areas of the top surfaces of the solid-electrolyte layer and the negative electrode layer are equal. This causes the positive electrode layer to be covered with the solid-electrolyte layer at a cutoff surface. It is therefore possible to make it substantially impossible that the positive electrode active material of the positive electrode layer and the negative electrode active material of the negative electrode layer come into contact with each other. This improves the reliability of the laminated body 321.

According to the first and second production methods, there are no particular limitations on a method of cutting off the outer peripheral edges of the laminated bodies 310 and 320. The outer peripheral edges are cut off from the laminated bodies 310 and 320 most easily by performing punching as described below.

According to Embodiment 1, as illustrated in FIG. 5, a precision punching device 400 is used to perform cutoff. The precision punching device 400 includes a punch 401, a die 402, and a presser board 403. By using a punching die having a shape illustrated in FIG. 5 (i.e., including the punch 401, the die 402, the presser board 403, and the like), it is possible to obtain, with one-time punching, each of the laminated bodies 311 and 321 from a single laminated body 310 and a single laminated body 320, respectively.

The punching conditions depend on, for example, (i) the materials and thicknesses of the laminated body 310, 320 to be punched out and (ii) the pressurizing force of the laminated bodies. A clearance C between the punch 401 and the die 402 is preferably 0 to several hundreds of μm, and an insertion speed V of the punch 401 is preferably several mm/sec to several tens of mm/sec. A larger clearance C would cause the burrs to easily occur. Therefore, the clearance C is preferably as small as possible. A smaller clearance C is more likely to cause damage to a blade edge 401a of the punch 401 and a blade edge 402a of the die 402. According to Embodiment 1, the clearance C is 3 μm, and the insertion speed V of the punch 401 is 30 mm/sec.

In addition, the die 402 has a flank 402b. The clearance angle θ1 forming the flank 402b is approximately several degrees. The flank 402b makes it possible to prevent the cross section of the laminated body 310, 320 from being made rough by the inner peripheral wall of the die 402.

The flank 402b can be provided from a position in the vicinity of an upper edge to a lower edge of the die 402. Note, however, that the flank 402b thus provided shortens the life of the die 402. In order to extend the life of the die 402, therefore, the flank 402b is preferably formed below intermediate portions of the inner peripheral wall of the die 402 as illustrated in FIG. 5. In addition, portions above the intermediate portions of the inner peripheral wall of the die 402 are formed as parallel surfaces extending substantially parallel to the outer peripheral walls of the punch 401.

Note that the punch 401 is driven so that a bottom edge surface of the punch 401 reaches below the lower edges of the parallel surfaces at a bottom dead center of the punch 401.

The laminated body 310, 320 becomes extremely firm due to the pressurization treatment, and is therefore sufficiently strong to withstand the punching by the punch 401.

Note that it is possible to perform punching even without providing the presser board 403.

Note also that it is preferable to insulate an appropriate part so as to prevent the positive electrode layer 302, 312 and the negative electrode layer 304, 314 from being short-circuited while the laminated body 310, 320 is pressed by the presser board 403. The punch 401, the die 402, and the like are also preferably configured so as to prevent a short circuit caused by the punch 401, the die 402, and the like during punching. Examples of such a configuration to prevent the short circuit encompass (i) insulating the presser board 403 and (ii) coating the surfaces of the punch 401 and the die 402.

In addition, the cutoff can be performed with use of Thomson blade or another blade. The cutoff can be performed by using, for example, a laser, shirring, or a cutting machine, as an alternative to a blade.

According to Embodiment 1, as illustrated in FIGS. 6 and 7, it is possible to cut off the outer peripheral edges from the laminated body 310, 320 by dividing through a chocolate break method. The chocolate break method is applied by, for example, (i) providing, with use of a cutter blade or the like, a division groove on a part of the surface of the support plate 301 of the laminated body 310, 320, which part corresponds to the cutoff shape 306, 316 and then (ii) applying a bending moment to the laminated body 310, 320 by impact, bending, or the like. This makes it possible to break the laminated body 310, 320 along the division groove. Of course, the laminated bodies 311 and 321 can be cut out to have a desired shape by providing the division groove having the desired shape.

For example, as illustrated in FIG. 6, the laminated body 501 can be broken by applying a bending moment to both sides of a division groove 501a of the laminated body 501. Specifically, the division groove 501a (groove) is provided on a surface on one side of the support plate (e.g. the above-described support plate 301) of the laminated body 501. Therefore, the division groove 501a is not provided on a surface on the other side of the support plate (i.e. the layer surface which is an interface between the support plate and the positive electrode layer or an interface between the support plate and the negative electrode layer).

A bending moment is applied to both sides of the division groove 501a of such a laminated body 501 so that stress is concentrated on the division groove 501a. This breaks the laminated body 501. A method of applying force is not limited to the method described above, but the force can be applied to the laminated body 501 by any method in which bending stress, shearing stress, or both of bending stress and shearing stress is/are applied to parts around the division groove 501a.

For example, as illustrated in FIG. 7, the laminated body 501 can be broken while the laminated body 501 is fixed with use of a first presser board 601 and a second presser board 602. Specifically, while the laminated body 501 is sandwiched and fixed between the first presser board 601 and the second presser board 602 at a position away from the division groove 501a to one side by a certain distance, a load is applied to a position away from the division groove 501a to the other side by a certain distance. This causes the laminated body 501 to be broken.

The division groove 501a preferably has a width of less than 1 mm and a depth of not more than ¹⁄₁₀ of a total thickness of the laminated body 501, depending on, for example, (i) the material of which the laminated body 501 is made, (ii) the thickness of the laminated body 501, and (iii) pressurizing force applied during the formation of the laminated body 501.

Not only can the division groove 501a be made as a notch by a cutter blade as described above, but the division groove 501a can also be made by any method. For example, the division groove 501a can be formed by pressing, against the laminated body 501, a model having a protrusion corresponding to the shape of the division groove 501a. Alternatively, the division groove 501a can be formed with use of a rotary blade (made by providing a blade to a roller).

In addition, the division groove 501a can be provided on the surface of any of the positive electrode layer, the negative electrode layer, and the support plate (the positive electrode current collector or the negative electrode current collector (a positive electrode current collecting foil or a negative electrode current collecting foil)). However, in a case where the division groove 501a is to be provided on the surface of the positive electrode current collecting foil or the negative electrode current collecting foil, the current collecting foil is preferably in close contact with the positive electrode layer or with the negative electrode layer.

Each of the laminated bodies 12, 22, 32, 42, and 52 is obtained by cutting out the peripheral portions as described above. An edge of each of these laminated bodies 12, 22, 32, 42, and 52 is subjected to protection (covering) as necessary. In particular, in a case where the laminated body 311 is cut off by the first production method so that the interfaces between the positive electrode layer, the solid-electrolyte layer, and the negative electrode layer have an identical area, this protection step is preferably carried out in order to prevent (i) powder collapse at an edge and/or (ii) a short circuit.

Although the covering material needs to be selected according to the purpose of a battery to be produced, the covering material can basically selected from insulating materials such as a photocurable resin, a thermosetting resin, a two-liquid curable resin, a rubber, silicone, and ceramic. According to Embodiment 1, the photocurable resin is selected as a covering material which does not react with a solid electrolyte and which becomes cured at as low a temperature as possible. The protection structure at the edge of the laminated body 311 is formed by irradiating, with ultraviolet light or the like, the photocurable resin with which the edge of the laminated body 311 is coated.

In a case where an end product is a laminated body in which a plurality of laminated bodies 311 are stacked (a battery capacity and output power are insufficient with a single cell), it is possible to form a protection structure at the edge after a plurality of laminated bodies 311 are stacked, or it is possible to stack a plurality of laminated bodies 311 each having a protection structure formed at the edge thereof.

The all-solid-state batteries 1 through 5 are obtained by forming positive electrode current collectors 11, 21, 31, 41, and 51 and negative electrode current collectors 13, 23, 33, 43, and 53 on the laminated bodies 12, 22, 32, 42, and 52 obtained through the step above, respectively. Then, the all-solid-state batteries 1 through 5 are stacked and sealed in the package 8. This completes the all-solid-state battery 101.

Stacking and sealing of the all-solid-state batteries 1 through 5 will be described next.

Note that the following description will discuss a case where the all-solid-state battery 101 is an all-solid-state lithium-ion secondary battery. While an all-solid-state lithium-ion secondary battery yields a voltage even without connecting a plurality of all-solid-state batteries in series, the all-solid-state lithium-ion secondary battery does not yield a high electric current value if the laminated bodies are not connected in parallel. Therefore, the following description will discuss a structure in which the all-solid-state batteries 1 through 5 are connected in parallel as illustrated in FIG. 1.

Note that in a case where the all-solid-state batteries 1 through 5 are connected in series, the all-solid-state batteries 1 through 5 can be connected as in the case of the parallel connection. Alternatively, the all-solid-state batteries 1 through 5 can be connected simply by stacking the all-solid-state batteries 1 through 5 so that the positive and negative electrodes are aligned in the same direction.

In order to connect the all-solid-state batteries 1 through 5 in parallel (regardless of the presence/absence of the positive electrode current collector, the negative electrode current collector, and the covering of the edge), the all-solid-state batteries 1 through 5 are preferably stacked so that, for example, positive and negative electrodes face the opposite directions between adjacent ones of the all-solid-state batteries 1 through 5 as illustrated in FIG. 1. More specifically, the all-solid-state batteries 1 through 5 are provided so that if the all-solid-state battery 1 has its negative electrode layer on the negative-electrode side and has its positive electrode layer on the positive-electrode side, then (i) the all-solid-state battery 2 has its positive electrode layer on the negative-electrode side and has its negative electrode layer on the positive-electrode side and (ii) the all-solid-state battery 3 has its negative electrode layer on the negative-electrode side and has its positive electrode layer on the positive-electrode side.

In addition, the positive electrode current collectors 61 through 63 are provided at appropriate positions with respect to the positive electrode layers of the all-solid-state batteries 1 through 5 so as to be in contact with each other at least partially. In addition, the negative electrode current collectors 71 through 73 are provided at appropriate positions with respect to the negative electrode layers of the all-solid-state batteries 1 through 5 so as to be in contact with each other at least partially. Specifically, (i) the negative electrode current collector 71 is provided so as to be in contact with the negative electrode layer of the all-solid-state battery 1, (ii) the negative electrode current collector 72 is provided so as to be in contact with the respective negative electrode layers of the all-solid-state batteries 2 and 3, and (iii) the negative electrode current collector 73 is provided so as to be in contact with the respective negative electrode layers of the all-solid-state batteries 4 and 5. In addition, (i) the positive electrode current collector 61 is provided so as to be in contact with the positive electrode layer of the all-solid-state battery 5, (ii) the positive electrode current collector 62 is provided so as to be in contact with the respective positive electrode layers of the all-solid-state batteries 4 and 3, and (iii) the positive electrode current collector 63 is provided so as to be in contact with the respective positive electrode layers of the all-solid-state batteries 2 and 1.

Then, the positive electrode current collectors 61 through 63 are connected to the positive electrode terminal 60, and the negative electrode current collectors 71 through 73 are connected to the negative electrode terminal 70. The connection between the positive electrode current collectors 61 through 63, the connection between the negative electrode current collectors 71 through 73, the connection between the positive electrode current collectors 61 through 63 and the positive electrode terminal 60, and the connection between the negative electrode current collectors 71 through 73 and the negative electrode terminal 70 can be made by use of welding techniques such as ultrasonic welding, electric resistance welding, or laser welding. However, these connections can be made by not only these welding techniques but also other methods. For example, provided that the contact resistance can be sufficiently reduced, no problems will occur by using only physical contact such as (i) adhesion with use of an electrically conductive adhesive, (ii) swaging, or (iii) screwing.

Note that in a case where the support plate 301 of the laminated body 310, 320 serves as the positive electrode current collectors 11, 21, 31, 41, and 51, any ones of the positive electrode current collectors 11, 21, 31, 41, and 51 can serve as the positive electrode current collectors 61 through 63. For example, assume a case where the positive electrode current collectors 61 through 63 are integrated with the positive electrode current collectors 51, 31, and 11, respectively. In this case, the all-solid-state battery 4 is provided so that the positive electrode current collector 41 is in contact with the positive electrode current collector 31 serving also as the positive electrode current collector 62, and the all-solid-state battery 2 is provided so that the positive electrode current collector 21 is in contact with the positive electrode current collector 11 serving also as the positive electrode current collector 63. In addition, assume a case where the positive electrode current collectors 61 through 63 are integrated with the positive electrode current collectors 51, 41, and 21, respectively. In this case, the all-solid-state battery 3 is provided so that the positive electrode current collector 31 is in contact with the positive electrode current collector 41 serving also as the positive electrode current collector 62, and the all-solid-state battery 1 is provided so that the positive electrode current collector 11 is in contact with the positive electrode current collector 21 serving also as the positive electrode current collector 63.

In any the cases, for forming positive electrode current collectors which serve also as the positive electrode current collectors 61 through 63, it is necessary, in the step of cutting off the outer peripheral edges from the laminated body 310, 320, that a connection part of the support plate 301 to be connected to the positive electrode terminal 60 is kept without being cut off. Alternatively, in a case where the positive electrode current collectors have no connection part, it is necessary with use of any connecting member to electrically connect the positive electrode current collectors to the positive electrode terminal 60.

As has been described, the all-solid-state battery 101 production method in accordance with Embodiment 1 includes: the laminated body forming step of forming a laminated body including (i) a positive electrode layer, (ii) a negative electrode layer, and (iii) a solid-electrolyte layer disposed between the positive electrode layer and the negative electrode layer; and a cutoff step of cutting off outer peripheral edges of the laminated body so as to form a laminated body including a powder material.

With the laminated body thus produced, it is possible to remove outer peripheral edges which easily collapse due to alignment accuracy, formation accuracy, uneven pressurization between edges and the center part, or the like during formation of each layer. This makes it possible to obtain new outer peripheral edges which are unlikely to collapse. It is therefore possible to prevent a short circuit from occurring between electrodes due to the collapse of the outer peripheral edges.

In addition, the production method can further include a pressurization step of pressurizing the laminated body. This allows the entire laminated body to be uniform.

In addition, in the production method, the outer peripheral edges of the laminated body can be cut off with use of a blade or a cutting die. This makes it possible to cut off the outer peripheral edges at once. It is therefore possible to perform cutoff efficiently.

In addition, it is possible that (i) the laminated body includes a support plate (support plate 301) which has one surface having a groove and the other surface being in contact with a layer surface of the laminated body (an interface between the laminated body and the support plate) and (ii) the production method is carried out so as to divide the laminated body by a chocolate break method. This makes it possible to easily divide the laminated body along the groove of the support plate. It is therefore possible to cut out the outer peripheral edges without using a large-scale apparatus.

Furthermore, the production method can be carried out so that in the cutoff step, cutting off of the outer peripheral edges and dividing of the laminated body into a plurality of parts are performed simultaneously. This makes it possible to simultaneously (i) cut off the outer peripheral edges and (ii) obtain a plurality of laminated bodies into which the laminated body is divided. It is therefore possible to easily produce a plurality of batteries.

(Comparison of all-Solid-State Batteries)

FIG. 8 is a cross-sectional view illustrating a structure of an all-solid-state battery 102 in accordance with Comparative Example of Embodiment 1.

The following description will discuss comparisons between (i) all-solid-state batteries 101 produced by the first and second production methods described above and (ii) the all-solid-state battery 102 in accordance with Comparative Example.

Example 1

In Example 1, the all-solid-state battery 101 prepared by the first production method with use of the laminated body 310 will be discussed.

In Example 1, in the steps illustrated in FIGS. 3A through 3C, a positive electrode layer 302, a solid-electrolyte layer 303, and a negative electrode layer 304 were formed so that interface between these layers have an identical area. In Example 1, however, the outer peripheral edges of the laminated body 310 are cut off as illustrated in FIG. 3D. Therefore, ultimately, portions further outside than the portions to be cut off can be in any state. Therefore, there are no limitations on which of the three layers is larger than another and no limitations on the shapes of the three layers.

In addition, in Example 1, the positive electrode layer 302, the solid-electrolyte layer 303, and the negative electrode layer 304 were formed in this order as powder layers on the positive electrode current collector serving as the support plate 301, for example. The method of forming the powder layers is as described above. Note that a negative electrode current collector can be placed on (or integrated with) the negative electrode layer 304. In addition, main pressurization is preferably performed while a metal foil to be a negative electrode current collector is stacked on the negative electrode layer 304. After the pressurization, this metal foil can be removed.

Thereafter, the outer peripheral edges of the laminated body 310 are cut out. This made it possible to obtain a laminated body 311 having a desired shape (e.g. square shape) and a desired area with which no edge collapse or no edge short circuit occurs.

Note that an unnecessary portion of the support plate 301 (current collector) can be removed in the cutoff step. It is therefore possible to use a large support plate 301 to make it easier to handle the support plate 301 for improving production reliability.

5 of laminated bodies 311 thus obtained were prepared, and edges thereof were protected as necessary, so that the laminated-solid-state batteries 1 through 5 were obtained. The laminated-solid-state batteries 1 through 5 were connected in parallel, so that the all-solid-state battery 101 was produced.

The laminated bodies 311 thus obtained each had a square shape having dimensions of 50 mm×50 mm, and each had an effective area ratio (chargeable and dischargeable area ratio) of 100%. The outer dimensions of the all-solid-state battery 101 including a package 8 were 55 mm×55 mm×2.5 mm, and the weight of the all-solid-state battery 101 was approximately 10 g. In addition, no unnecessary insulator or the like was present for preventing an edge short circuit in the package 8, except that the inner surfaces of the package were insulated.

Example 2

In Example 2, the all-solid-state battery 101 prepared by the second production method with use of the laminated body 320 will be discussed.

In Example 1, by cutting out the peripheral portions of the laminated body 310, it was possible to prevent edge collapse and the like which occur during formation of the powder films and/or during pressurization of the powder films. However, there is a possibility that the negative electrode layer 304 and the positive electrode layer 302 may be short-circuited during the cutoff. A thinner solid-electrolyte layer 303 leads to a higher possibility that the short circuit may occur due to the cutoff.

In Example 2, therefore, as illustrated in FIG. 4A through 4C, a positive electrode layer 312 (or a negative electrode layer 314) was formed to be the smallest, and a solid-electrolyte layer 313 was formed so as to cover a top surface and a side surface of the positive electrode layer 312 (or the negative electrode layer 314). In this case, in order to cover the positive electrode layer 312 with the solid-electrolyte layer 313, the step of forming a covering part of the solid-electrolyte layer 313 was added. This step was carried out, in the device illustrated in FIG. 2, with use of the screen 201 for forming the covering part which covers the side surface of the positive electrode layer 312. However, a method of obtaining such a configuration is not limited to the method described above, but can be any other method.

As described above, the laminated body 320 was prepared so that (i) a top surface of the positive electrode layer 312 has the smallest area and (ii) a top surface of the solid-electrolyte layer 313 has the largest area. Another laminated body 320 was also prepared so that (i) the top surface of the positive electrode layer 312 has the smallest area and (ii) the top surfaces of the solid-electrolyte layer 313 and of the negative electrode layer 314 have the largest area. Then, as illustrated in FIG. 4D, the outer peripheral edges were cut off at portions where no positive electrode layer 312 was present (in this case, the portions where only the solid-electrolyte layer 313 and the negative electrode layer 314 were present on the support plate 301). Because outer peripheral edges are sheared by cutoff, it is possible to substantially eliminate the possibility that the positive electrode active material and the negative electrode active material would come into contact with each other.

Note that as in the case of Example 1, an unnecessary portion of the support plate 301 (current collector) can be removed in the cutoff step. It is therefore possible to use a large support plate 301 to make it easier to handle the support plate 301 for improving production reliability.

5 of laminated bodies 321 thus obtained were prepared, and edges of the laminated bodies 321 were protected as necessary, so that the laminated bodies 12, 22, 32, 42, and 52 were obtained. Then, with use of the laminated bodies 12, 22, 32, 42, and 52 thus obtained, all-solid-state batteries 1 through 5 were prepared. Then, the all-solid-state batteries 1 through 5 were connected in parallel, so that the all-solid-state battery 101 was produced.

The laminated bodies 321 thus obtained each had a square shape having dimensions of 50 mm×50 mm, and each had an effective area ratio of 96% (49 mm×49 mm) because the peripheral portions had slight portions where no positive electrode layer was present. The outer dimensions of the all-solid-state battery 101 including a package 8 were 55 mm×55 mm×2.5 mm, and the weight of the all-solid-state battery 101 was approximately 10 g. The weight of the all-solid-state battery 101 was approximately 10 g. In addition, no unnecessary insulator or the like was present for preventing an edge short circuit in the package 8, except that the inner surfaces of the package were insulated.

In order to achieve a laminated body 321 having a structure as discussed in Example 2, ingenuity is necessary in the forming step as illustrated in FIG. 4A through 4C, or it is necessary to increase the number of steps. Therefore, in actual production of batteries, it is only necessary to select any one of Examples 1 and 2, depending on, for example, (i) the thickness of the solid-electrolyte layer and (ii) the probability of a short circuit occurring due to the cutoff.

Comparative Example

As Comparative Example, an all-solid-state battery 102, which was produced by a conventional production method, will be discussed.

As illustrated in FIG. 8, the all-solid-state battery 102 includes all-solid-state batteries 1A through 5A, a positive electrode current collector 6, a negative electrode current collector 7, and a package 8.

The all-solid-state battery 1A, the all-solid-state battery 2A, the all-solid-state battery 3A, the all-solid-state battery 4A, and the all-solid-state battery 5A are arranged in this order from a negative-electrode side.

The all-solid-state battery 1A is configured so that a positive electrode current collector 111, a laminated body 12, and a negative electrode current collector 113 are stacked in this order.

The all-solid-state battery 2A is configured so that a positive electrode current collector 121, a laminated body 22, and a negative electrode current collector 123 are stacked in this order.

The all-solid-state battery 3A is configured so that a positive electrode current collector 131, a laminated body 32, and a negative electrode current collector 133 are stacked in this order.

The all-solid-state battery 4A is configured so that a positive electrode current collector 141, a laminated body 42, and a negative electrode current collector 143 are stacked in this order.

The all-solid-state battery 5A is configured so that a positive electrode current collector 151, a laminated body 52, and a negative electrode current collector 153 are stacked in this order.

The positive electrode current collectors 111, 121, 131, 141, and 151 and the negative electrode current collectors 113, 123, 133, 143, and 153 are formed so as to have interfaces having areas larger than those of the laminated bodies 12, 22, 32, 42, and 52, respectively. In addition, the positive electrode current collectors 111, 121, 131, 141, and 151 and the negative electrode current collectors 113, 123, 133, 143, and 153 are provided so that the outer peripheral edges of these current collectors protrude further outside than the outer peripheral edges of the laminated bodies 12, 22, 32, 42, and 52, respectively.

According to the all-solid-state battery 102 thus configured, all-solid-state batteries 1A through 5A are not prepared by cutting off the outer peripheral edges while in a state of laminated bodies. This causes the outer dimensions of the positive electrode current collectors 111, 121, 131, 141, and 151 and the negative electrode current collectors 113, 123, 133, 143, and 153 to be larger than those of the positive electrode current collectors 11, 21, 31, 41, and 51 and the negative electrode current collectors 13, 23, 33, 43, and 53 in Examples 1 and 2. The all-solid-state batteries 1A through 5A thus obtained each had outer dimensions of 51 mm×51 mm, and each had an effective area ratio (chargeable and dischargeable area ratio) of 92% (49 mm×49 mm) because the peripheral portions had slight portions where no was present.

In addition, according to the all-solid-state battery 102, no current collectors are cut off. This makes it necessary to package the all-solid-state batteries 1A through 5A while, for example, insulators (not illustrated) for preventing edge collapse and handling portions are left present. The outer dimensions of the all-solid-state battery 102 including a package 8 were 66 mm×66 mm×2.5 mm, and the weight of the all-solid-state battery 102 was approximately 15 g. In addition, it is possible to enlarge current collectors for improving a yield rate and it is possible to slightly improve handleability. However, a package volume and a weight increase, and, furthermore, an energy density decreases.

Comparison Results

In a thermostatic chamber, each of the all-solid-state batteries 101 produced in Examples 1 and 2 and the all-solid-state battery 102 produced in Comparative Example was kept at 25° C., and was charged to a charge completion voltage of 4.2 V with an electric current of 0.05 mA/cm$^2$, and then discharged to a discharge completion voltage of 2.8 V with an electric current of 0.05 mA/cm$^2$. The results of Examples are shown in Table 1.

Table 1 indicates that in comparison with the all-solid-state battery 102 in Comparative Example, the all-solid-state batteries 101 in Examples 1 and 2 are (i) smaller in terms of the volume of the package 8 and (ii) lighter in terms of the battery weight. Therefore, the energy density per volume and the energy density per weight are both larger in Examples 1 and 2.

In addition, according to the all-solid-state battery 102 in Comparative Example, the following, for example, easily occur: (i) edge collapse, (ii) a short circuit at an edge, and (iii) uneven densities of the powder layers due to in-plane uneven pressurization. This led to a low yield rate of 65%. In contrast, it is indicated that the yield rates of the all-solid-state batteries 101 in Examples 1 and 2 are 85% and 90%, respectively, which are considerably improved.

As shown above, according to the conventional all-solid-state battery 102 as shown in Comparative Example, the volume (of the insulator, the edge with no electrode layer, the sealing part, and the like) of an end product (battery), which does not contribute to charge and discharge, is unfortunately large. This makes it difficult to produce a battery having a large energy density or power density per weight or a large energy density or power density per volume.

In contrast, with the all-solid-state battery 101 production method in accordance with Example 2 (Embodiment 1), it is possible to produce a battery which (i) can be produced without a yield decrease which occurs due to a short circuit at edges of electrode layers (positive electrode layer, negative electrode layer) and (ii) has a large energy density or power density per weight or a large energy density or power density per volume.

Embodiment 2

Figure 9:
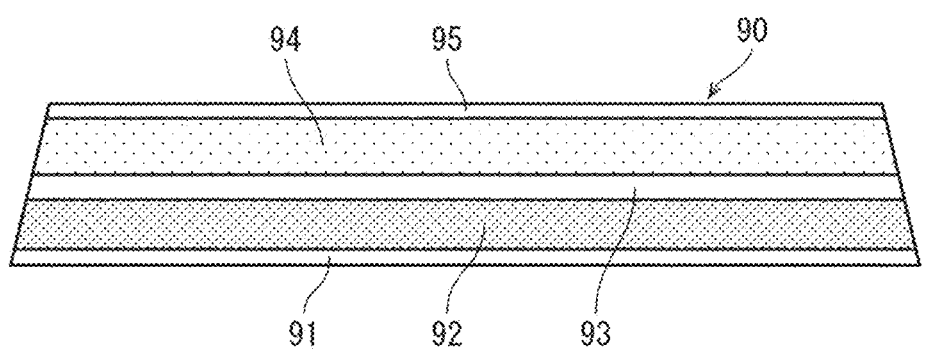
FIG. 9 is a cross-sectional view illustrating a structure of an all-solid-state battery in accordance with Embodiment 2 of the present invention.
Figure 10:
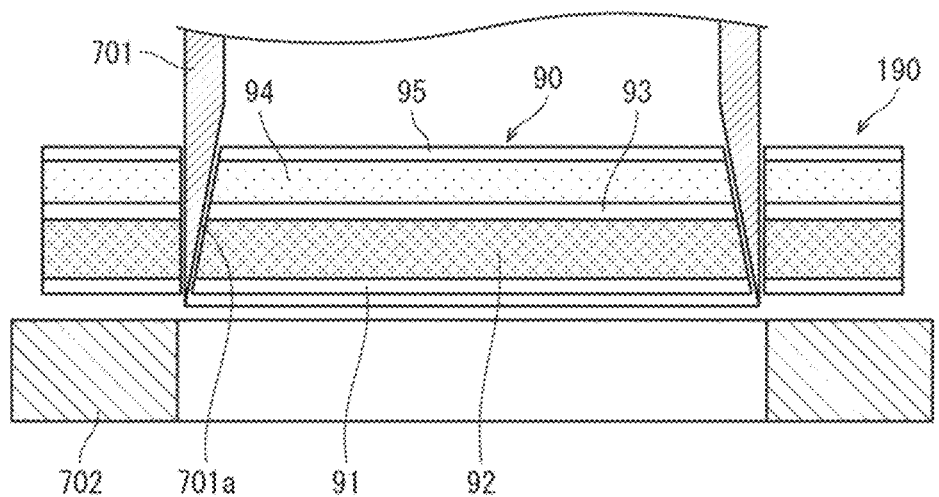
FIG. 10 is a cross-sectional view illustrating the all-solid-state battery during a cutoff step in production of the all-solid-state battery illustrated in FIG. 9.

The following description will discuss Embodiment 2 of the present invention with reference to FIGS. 9 and 10. Note that, in Embodiment 2, constituent elements having functions identical to those of constituent elements in Embodiment 1 are given identical reference signs and will not be described.

FIG. 9 is a cross-sectional view illustrating a structure of an all-solid-state battery 90 in accordance with Embodiment 2.

As illustrated in FIG. 9, the all-solid-state battery 90 has a structure in which a negative electrode current collector 91 (support plate), a negative electrode layer 92, a solid-electrolyte layer 93, a positive electrode layer 94, and a positive electrode current collector 95 are stacked in this order.

The negative electrode current collector 91 is made of a material identical to the material of which the negative electrode current collectors 71 through 73 of the all-solid-state battery 101 in accordance with Embodiment 1 are made. The positive electrode current collector 95 is made of a material identical to the material of which the positive electrode current collectors 61 through 63 of the all-solid-state battery 101 are made.

The positive electrode layer 94 (first electrode layer) is made of a material identical to the material of which the positive electrode layer of the all-solid-state battery 101 is made. The negative electrode layer 92 (second electrode layer) has a polarity opposite of that of the positive electrode layer 94, and is made of a material identical to the material of which the negative electrode layer of the all-solid-state battery 101 is made. The solid-electrolyte layer 93 is disposed between the negative electrode layer 92 and the positive electrode layer 94, and is made of a material identical to the material of which the solid-electrolyte layer of the all-solid-state battery 101 is made.

TABLE 1

| | Production Method | | | | | |
|---|---|---|---|---|---|---|
| | Effective Area (mm$^2$) | Package Volume (mm$^3$) | Battery Weight (g) | Energy Density (Wh/L) | Energy Density (Wh/kg) | Yield Rate (%) |
| Example 1 | 50 × 50 | 55 × 55 × 2.5 | 10 | 137 | 104 | 85 |
| Example 2 | 49 × 49 | 55 × 55 × 2.5 | 10 | 132 | 99 | 90 |
| Comparative Example | 49 × 49 | 66 × 66 × 2.5 | 15 | 91 | 66 | 65 |

The positive electrode layer 94, the solid-electrolyte layer 93, and the negative electrode layer 92 each have a top surface and a bottom surface. The areas of the top surfaces of the positive electrode current collector 95, the positive electrode layer 94, the solid-electrolyte layer 93, the negative electrode layer 92, and the negative electrode current collector 91 become larger in the order named. The area of an interface between the bottom surface of the positive electrode layer 94 and the top surface of the solid-electrolyte layer 93 is smaller than the area of an interface between the bottom surface of the solid-electrolyte layer 93 and the top surface of the negative electrode layer 92.

The side surfaces of the all-solid-state battery 90 each form a single flat surface which is continuously inclined throughout. Each of the side surfaces of the all-solid-state battery 90 need only be continuously inclined and form a curved surface (a convex surface or a concave surface). The side surfaces of the all-solid-state battery 90 thus formed as convex surfaces are unlikely to undergo edge collapse. Note that the form, in which each of the side surfaces of the all-solid-state battery 90 is inclined, is not limited to the form in which, as illustrated in FIG. 9, a single flat surface (inclined surface) is formed throughout.

For example, the side surfaces can each be formed so that a plurality of inclined surfaces (multi-level inclined surfaces) having different inclinations are continuously formed throughout. The inclination of each inclined surface is not limited to any particular angle, but can be set according to various factors. In addition, the position of an interface between adjacent inclined surfaces can be any position of the side surface.

In addition, the side surface can be inclined in a curved shape. The curved shape is not limited to any particular shape, but can be, for example, the curved shape described above.

Alternatively, part of the side surface can be an inclined surface. The range, in which such an inclined surface is formed, is not limited to any particular range, but can be an intermediate portion of the side surface, both edge sides of the side surface, or one side of both edges. Such a side surface can also be considered inclined.

The side surfaces formed in any of such various forms can be obtained by cutting off the outer peripheral edges of an all-solid-state battery 190 with use of a blade having inner side shapes corresponding to the shapes of the side surfaces. Examples of the blade encompass a blade 701a illustrated in FIG. 10 (described later). In other words, the design of the shapes of the blade makes it possible to obtain side surfaces having desired shapes. For example, in a case where a multi-level inclined surface is to be formed in each of the side surfaces, cutoff is performed with use of a blade, an inner side of which has a plurality of inclined surfaces corresponding to the respective inclined surfaces of the multi-level inclined surfaces.

Next, production of the all-solid-state battery 90 configured as described above will be described.

FIG. 10 is a cross-sectional view illustrating the all-solid-state battery 190 during a cutoff step in production of the all-solid-state battery 90.

First, a laminated body is prepared as in the case of preparing the laminated body 310, 320 described with reference to FIGS. 3A through 3D and 4A through 4D in Embodiment 1. Then, the negative electrode current collector 91 and the positive electrode current collector 95 are further provided so as to prepare the all-solid-state battery 190 illustrated in FIG. 10 (laminated body forming step). Then, the negative electrode layer 92, the solid-electrolyte layer 93, the positive electrode layer 94, and the positive electrode current collector 95 are stacked in this order on the negative electrode current collector 91, so that the all-solid-state battery 190 is obtained.

In forming the all-solid-state battery 190, each layer is pressurized while each layer is formed. Alternatively, the all-solid-state battery 190 can be formed by (i) forming a three-layer laminated body including the negative electrode layer 92, the solid-electrolyte layer 93, and the positive electrode layer 94, (ii) pressurizing the laminated body, (iii) providing the laminated body on the negative electrode current collector 91, and then (iv) forming the positive electrode current collector 95 on the laminated body.

Next, the outer peripheral edges of the all-solid-state battery 190 including the laminated body is cut off (cutoff step). This makes it possible to pressurize powder layers substantially uniformly, so that an all-solid-state battery 90 which is uniform throughout the edges can be obtained.

In addition, the side surfaces of the all-solid-state battery 90 after the cutoff step are preferably protected with use of an insulator such as a resin, a rubber, or a ceramic.

According to Embodiment 2, the cutoff is performed with use of a precision punching device including a punch 701 and a die 702 as illustrated in FIG. 10. By using the punching die having a shape illustrated in FIG. 10, the all-solid-state battery 90 can be obtained from a single all-solid-state battery 190 by one-time punching. In addition, the blade 701a of the punch 701 has at least an inner blade, on the inner side, which becomes thinner toward a blade edge. However, the blade 701a can be a double-beveled blade. By performing cutoff with use of such a punch 701, it is possible to obtain an all-solid-state battery 90 having side surfaces which are inclined at respective sides corresponding to the blade. This makes it possible to easily achieve breaking at the dividing lines L1 and L2 illustrated in FIG. 3D and FIG. 4D.

Note that the cutoff can be performed with use of a blade, a laser, or the like other than the punch 701, provided that the all-solid-state battery 190 can be cut so that the cross section of the all-solid-state battery 90 is inclined as illustrated in FIG. 10.

The all-solid-state battery 90 produced by the production method described above is configured so that, in terms of the areas of interfaces at which the layers are stacked together, (i) the positive electrode layer 94 is smaller than the negative electrode layer 92 and (ii) neither the positive electrode layer 94 nor the negative electrode layer 92 are constant thicknesswise.

It should be noted that if a lithium-ion battery has an excess positive electrode which no negative electrode faces, then floating metallic lithium is deposited at an edge of a negative electrode layer in the vicinity of the excess positive electrode, so that a short circuit easily occurs. The short circuit occurring between the electrodes due to the deposited lithium causes a battery to no longer function. Therefore, a lithium-ion battery is configured in general so that a negative electrode layer has an area larger than that of a positive electrode layer.

In addition, if layers are stacked one by one, portions at which edges of the layers are not overlapping are wasted. Even if the negative electrode layer is prepared so as to have a large area, shifting of the position of the positive electrode layer on the negative electrode layer makes it impossible for the negative electrode layer to absorb the lithium ions deposited from the positive electrode layer. It is therefore meaningless to enlarge the negative electrode layer. Therefore, the negative electrode layer is formed to be large in view of placement (alignment) errors of the positive electrode layer. This causes the negative electrode layer to be unnecessarily large, and ultimately causes the size of a battery to be large.

According to the all-solid-state battery 90 in accordance with Embodiment 2, in contrast, the side surfaces are inclined. This prevents the outer peripheral edge surfaces of the laminated body from having portions where each layer is protruding. Therefore, unlike a conventional all-solid-state battery produced by stacking a positive electrode layer and a negative electrode layer one by one, it is possible to avoid a short circuit between a positive electrode layer and a negative electrode layer, which short circuit occurs due to collapse of a portion where the positive electrode layer and the negative electrode layer are protruding.

Note that according to Embodiment 2, the area of the top surface of the negative electrode layer 92 is larger than the area of the top surface of the positive electrode layer 94. Alternatively, the area of the top surface of the positive electrode layer 94 can be larger than the area of the top surface of the negative electrode layer 92.

Embodiment 3

The following description will discuss Embodiment 3 of the present invention with reference to FIGS. 2 and 10 through 13. Note that, in Embodiment 3, constituent elements having functions identical to those of constituent elements in Embodiment 1 are given identical reference signs and will not be described.

Figure 11:
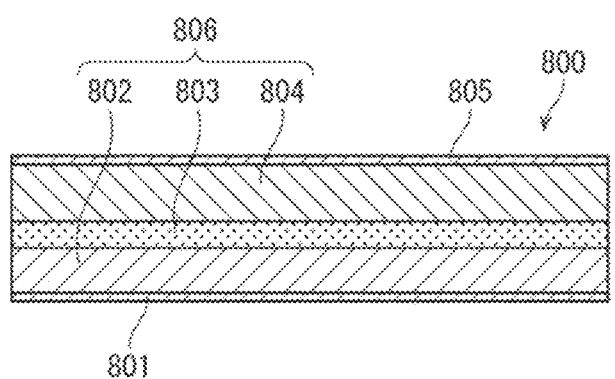
FIG. 11 is a cross-sectional view illustrating a structure of an all-solid-state battery in accordance with Embodiment 3 of the present invention.

FIG. 11 is a cross-sectional view illustrating a structure of an all-solid-state battery 800 in accordance with Embodiment 3.

As illustrated in FIG. 11, the all-solid-state battery 800 has a structure in which a positive electrode current collector 801, a positive electrode layer 802, a solid-electrolyte layer 803, a negative electrode layer 804, and a negative electrode current collector 805 are stacked in this order. The positive electrode layer 802, the solid-electrolyte layer 803, and the negative electrode layer 804 form a laminated body 806 in the all-solid-state battery 800.

The positive electrode current collector 801 is made of a material identical to the material of which the positive electrode current collectors 61 through 63 of the all-solid-state battery 101 are made. The negative electrode current collector 805 is made of a material identical to the material of which the negative electrode current collectors 71 through 73 of the all-solid-state battery 101 in accordance with Embodiment 1 are made.

The positive electrode layer 802 (first electrode layer) is made of a material identical to the material of which the positive electrode layer of the all-solid-state battery 101 is made. The negative electrode layer 804 (second electrode layer) has a polarity opposite of that of the positive electrode layer 802, and is made of a material identical to the material of which the negative electrode layer of the all-solid-state battery 101 is made. The solid-electrolyte layer 803 is disposed between the positive electrode layer 802 and the negative electrode layer 804, and is made of a material identical to the material of which the solid-electrolyte layer of the all-solid-state battery 101 is made.

Next, production of the all-solid-state battery 800 configured as described above will be described.

Figure 12:
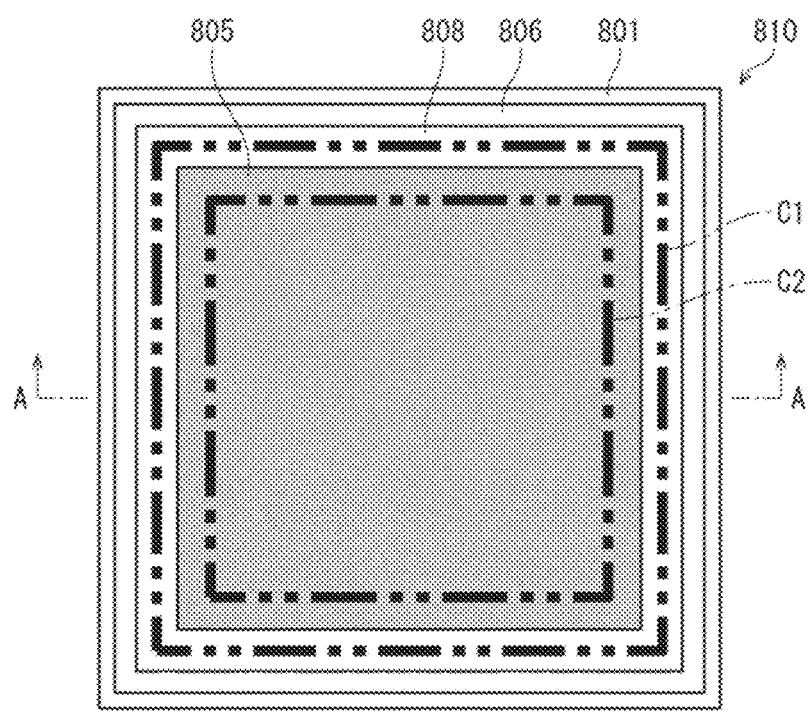
FIG. 12 is a plan view illustrating a structure before outer peripheral edges of the all-solid-state battery illustrated in FIG. 11 are cut off.
Figure 13:
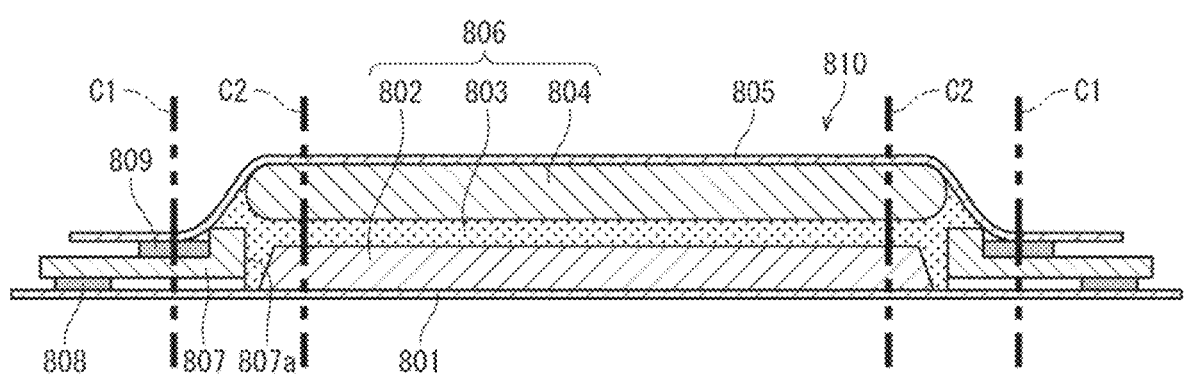
FIG. 13 is a cross-sectional view taken along the line A-A illustrated in FIG. 12.

FIG. 12 is a plan view illustrating a structure before outer peripheral edges of the all-solid-state battery 800 are cut off. FIG. 13 is a cross-sectional view taken along the line A-A illustrated in FIG. 12.

As illustrated in FIGS. 12 and 13, on the positive electrode current collector 801 having a square shape, an insulating member 807 having an opening 807a is first provided in a region where the laminated body 806 would be formed. Then, the insulating member 807 is caused to adhere to the lower adhesive layer 808. The insulating member 807 is (i) formed so as to have a square shape having an area smaller than that of the positive electrode current collector 801 and (ii) provided so that the outer peripheral edges of the insulating member 807 are positioned further inside than the outer peripheral edges of the positive electrode current collector 801 by a certain distance. In addition, the inner peripheral edges of the opening 807a are formed to have a thickness greater than that of a portion which is positioned further outside in a plate-like shape.

Next, with use of the device illustrated in FIG. 2, the laminated body 806 is formed on the region of the opening 807a of the insulating member 807 on the surface of the positive electrode current collector 801. First, the positive electrode layer 802 is formed on the positive electrode current collector 801. In this step, the positive electrode layer 802 is pressurized as necessary.

Next, on the positive electrode layer 802, the solid-electrolyte layer 803 is formed so as to cover the surface of the positive electrode layer 802 and cover the inner peripheral surfaces and the top surface of the insulating member 807. In this step, the solid-electrolyte layer 803 is pressurized as necessary.

Furthermore, the negative electrode layer 804 is formed on the solid-electrolyte layer 803. The negative electrode layer 804 is pressurized as necessary.

Then, the negative electrode current collector 805 provided with an upper adhesive layer 809 is provided on the negative electrode layer 804, and is caused by the upper adhesive layer 809 to adhere to the plate-like part of the insulating member 807. In this adhesion, the negative electrode current collector 805 is subjected to pre-pressurization with a low pressure while air in the inner surface side of the negative electrode current collector 805 is being sucked. Thereafter, while the air inside is being sucked, main pressurization is performed with a high pressure.

The all-solid-state battery 810 is thus prepared (laminated body forming step) so that (i) the positive electrode layer 802, the solid-electrolyte layer 803, and the negative electrode layer 804 are stacked on the positive electrode current collector 801 and (ii) the negative electrode current collector 805 is provided.

In FIG. 12, the negative electrode current collector 805 is omitted so that the structure below the negative electrode current collector 805 can be seen.

Note that in the all-solid-state battery 810, the outer peripheral edges including the insulating member 807 not only do not contribute to charge and discharge, but also may be brittle because the thickness of the outer peripheral edges is different from that of the center part so that the outer peripheral edges may not be sufficiently compressed. Therefore, the outer peripheral edges are cut off with use of the precision punching device illustrated in FIG. 10.

In the cutoff, first, a portion further outside than a cutoff part C1 on the upper adhesive layer 809 is cut off at the cutoff part C1. Then, a portion further outside than a cutoff part C2 in the vicinity of the laminated body 806 is cut off at the cutoff part C2 (cutoff step).

The single all-solid-state battery 800 is thus obtained.

The outer peripheral edges of the all-solid-state battery 810 are cut off while rigidity of the portion further inside than the outer peripheral edges is greater than rigidity of the outer peripheral edges.

With the configuration above, by causing the outer peripheral edges to be more brittle than the all-solid-state battery 800 cut out from the all-solid-state battery 810, it is possible to cause the outer peripheral edges to absorb distortion of the laminated body 806 which occurs when the outer peripheral edges are cut off.

In order to achieve this, if the outer peripheral edges include a highly rigid member having high rigidity, the highly rigid member is cut off before the outer peripheral edges are cut off. Specifically, a portion including most of the insulating member 807 having high rigidity (highly rigid member) included in the outer peripheral edges around the all-solid-state battery 800 is cut off at the cutoff part C1.

With this configuration, it is possible to reduce the rigidity of the remaining portion of the outer peripheral edges when the remaining portion is cut off at the cutoff part C2.

In addition, the outer shape of the surrounding portion of the outer peripheral edges, that is, the shape of the outer periphery of the laminated body 806 is formed in advance so that, when the remaining portion is cut off at the cutoff part C2, the area of the remaining portion (surrounding portion) is, in the laminated body 806 having uniform rigidity, not more than the area of the all-solid-state battery 800 (inner side portion) which is positioned further inside than the surrounding portion so as to be cut out. For example, if the all-solid-state battery 800 is to be cut out to have dimensions of 50 mm×50 mm, the outer shape of the surrounding portion is desirably formed to have an area of not more than 2,500 mm², that is, the laminated body 806 is desirably formed to have dimensions of at least 70.7 mm×70.7 mm.

In the case of layers which, as in the case of the laminated body 806, are made of an identical material and are pressurized with an identical pressure, if the area of a surrounding portion is larger than the area of an inner side portion, the surrounding portion becomes not brittle when cutoff is performed. This makes it unlikely that distortion occurring at the inner side portion escapes to the surrounding portion. In contrast, as described above, the shape of the outer periphery of the laminated body 806 is formed with respect to the position of the cutoff part C2 so that the area of the outer peripheral part is not more than the area of the inner side portion. This causes the surrounding portion to be brittle when the surrounding portion is cut off, so that the distortion occurring at the inner side portion easily escape to the surrounding portion.

In addition, the pressurization of the laminated body 806 before the outer peripheral edges are cut off is preferably performed substantially with a pressure which does not cause the area of the laminated body 806 to change due to the pressurization.

With this configuration, it is possible to prevent the deformation of the all-solid-state battery 800 which is cut out from the laminated body 806.

In addition, the speed at which to cut off the surrounding portion at the cutoff part C2 is preferably not more than 500 mm/sec, and more preferably not more than 50 mm/sec.

When a hard material such as a metal material is to be cut off, shearing including punching is in general preferably fast (processing speed). Although the powder material of which the laminated body 806 is made is compressed in the all-solid-state battery 800, the powder material of the laminated body 806 has a characteristic of being more easily broken when a blade is inserted into the powder material, in comparison with a metal material. In addition, bonding of fine powders is no strong as metallic bond. This causes the fine powders to easily collapse on impact due to fast processing.

Therefore, by causing the speed of the cutoff as described above, it is possible to perform shearing so as to gradually cut the laminated body 806 without applying an impact to cause the laminated body 806, which is made of the powder material, to collapse. With a cutoff speed of not more than 50 mm/sec, it is possible to substantially prevent the laminated body 806 from collapsing due to the cutoff.

Embodiment 4

The following description will discuss Embodiment 4 of the present invention with reference to FIGS. 2, 10, and 14 through 16. Note that, in Embodiment 4, constituent elements having functions identical to those of constituent elements in Embodiment 1 are given identical reference signs and will not be described.

Figure 14:
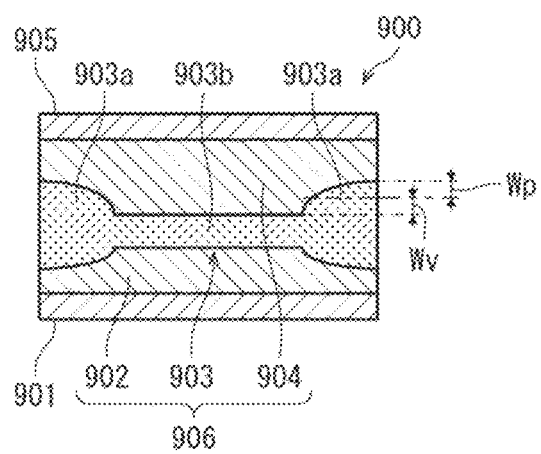
FIG. 14 is a cross-sectional view illustrating a structure of an all-solid-state battery in accordance with Embodiment 4 of the present invention.

FIG. 14 is a cross-sectional view illustrating a structure of an all-solid-state battery 900 in accordance with Embodiment 4.

As illustrated in FIG. 14, the all-solid-state battery 900 has a structure in which a positive electrode current collector 901, a positive electrode layer 902, a solid-electrolyte layer 903, a negative electrode layer 904, and a negative electrode current collector 905 are stacked in this order. The positive electrode layer 902, the solid-electrolyte layer 903, and the negative electrode layer 904 form a laminated body 906 in the all-solid-state battery 900.

The positive electrode current collector 901 is made of a material identical to the material of which the positive electrode current collectors 61 through 63 of the all-solid-state battery 101 are made. The negative electrode current collector 905 is made of a material identical to the material of which the negative electrode current collectors 71 through 73 of the all-solid-state battery 101 in accordance with Embodiment 1 are made.

The positive electrode layer 902 (first electrode layer) is made of a material identical to the material of which the positive electrode layer of the all-solid-state battery 101 is made. The negative electrode layer 904 (second electrode layer) has a polarity opposite of that of the positive electrode layer 902, and is made of a material identical to the material of which the negative electrode layer of the all-solid-state battery 101 is made. The solid-electrolyte layer 903 is disposed between the positive electrode layer 902 and the negative electrode layer 904, and is made of a material identical to the material of which the solid-electrolyte layer of the all-solid-state battery 101 is made.

The solid-electrolyte layer 903 is formed as an undulation membrane having waviness (undulation). Specifically, the solid-electrolyte layer 903 includes (i) thick film parts 903a formed at the outer peripheral parts so as to be thick and (ii) a thin film part 903b formed inside the thick film parts 903a.

Assume a case where the positive electrode layer 902, the solid-electrolyte layer 903, and the negative electrode layer 904 each have a thickness of 100 μm, and the laminated body 906 is formed to have a flat plate-like shape having a uniform thickness of 300 μm. For the laminated body 906 to have such a shape and for the solid-electrolyte layer 903 to have waviness, the following formula needs to be satisfied:

$$Wp-Wv/T=0.1 \text{ to } 2.0 \text{ [μm]}$$

In the formula above, (i) Wp indicates a maximum height of the thick film parts 903a with respect to a reference position which is an average thickness of the solid-electrolyte layer 903, (ii) Wv indicates a minimum height of the thin film part 903b with respect to the reference position, and (iii) T indicates the average thickness (μm) of the solid-electrolyte layer 903.

Note that when "Wp-Wv" with respect to any one of the positive electrode layer 902, the solid-electrolyte layer 903, and the negative electrode layer 904 is 200 μm, it is substantially the maximum value because the laminated body 906 is in the flat plate-like shape described above.

In the laminated body 906, the positive electrode layer 902 or the negative electrode layer 904 can have waviness, other than the solid-electrolyte layer 903. Alternatively, in the laminated body 906, at least one of the positive electrode layer 902, the solid-electrolyte layer 903, and the negative electrode layer 904 can have waviness. With any of the configurations above, the laminated body 906 needs to be formed to have a flat plate-like shape having a uniform thickness.

Next, production of the all-solid-state battery 900 configured as described above will be described.

Figure 15:
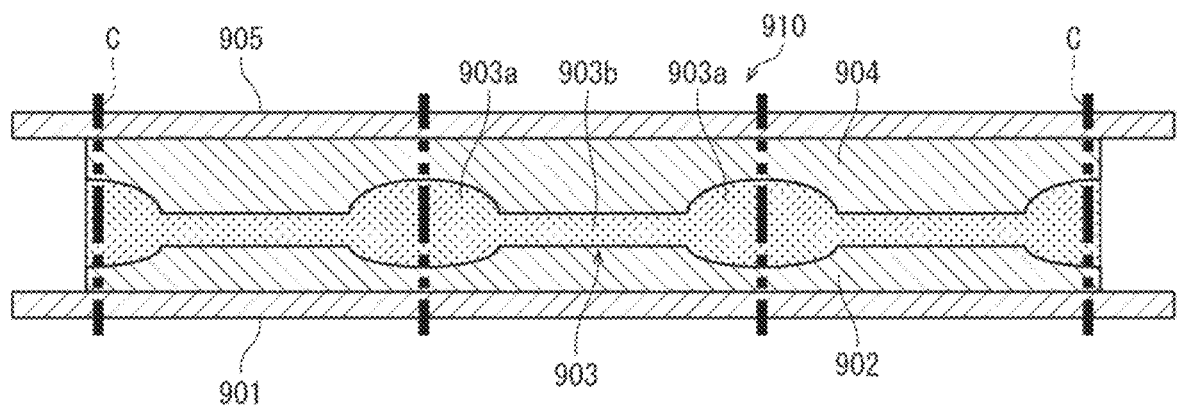
FIG. 15 is a cross-sectional view illustrating a structure before the all-solid-state battery illustrated in FIG. 14 is cut out from an all-solid-state battery having a large area.
Figure 16:
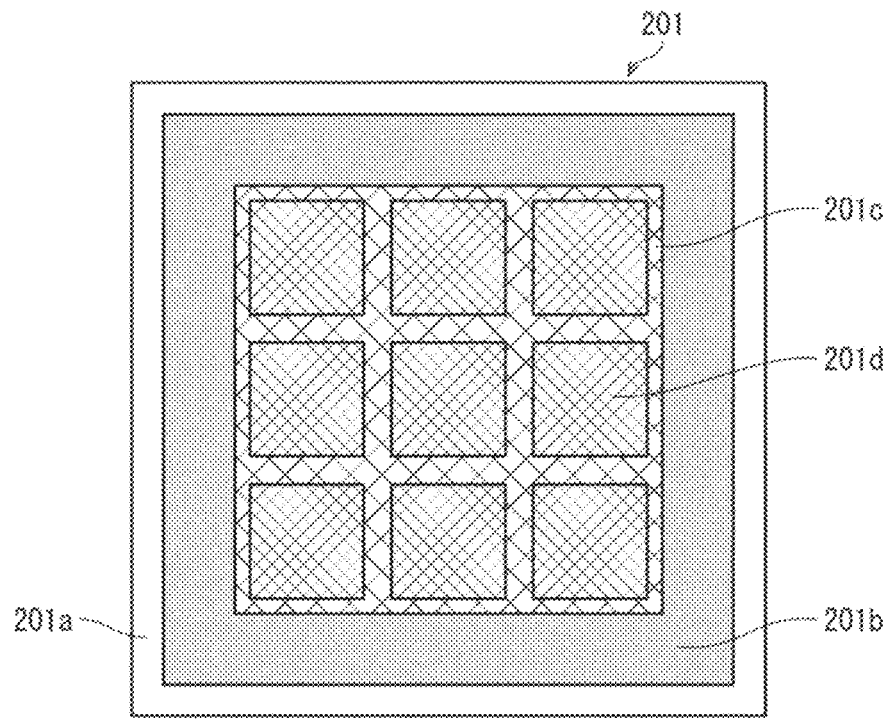
FIG. 16 is a plan view illustrating a structure of a screen used in a device illustrated in FIG. 2 for preparing a laminated body included in the all-solid-state battery illustrated in FIG. 15.

FIG. 15 is a cross-sectional view illustrating a structure before the all-solid-state battery 100 is cut out from the all-solid-state battery 910. FIG. 16 is a plan view illustrating a structure of a screen 201 used in the device illustrated in FIG. 2 for preparing a laminated body included in the all-solid-state battery 910 illustrated in FIG. 15.

As illustrated in FIG. 15, with use of the device illustrated in FIG. 2, the positive electrode layer 902, the solid-electrolyte layer 903, and the negative electrode layer 904 are formed on the positive electrode current collector 901 having a square shape. First, the positive electrode layer 902 is formed on the positive electrode current collector 901. In this step, the positive electrode layer 902 is pressurized as necessary.

Next, the solid-electrolyte layer 903 is formed on the positive electrode layer 902. In this step, the solid-electrolyte layer 903 is pressurized as necessary.

For forming the solid-electrolyte layer 903, the screen 201 illustrated in FIG. 16 is used. The screen 201 includes a screen frame 201a having a square shape. Inside the screen frame 201a, a non-opening part 201b for preventing a powder material from falling is provided. Inside the non-opening part 201b, openings 201c and 201d are further provided. In the opening 201c having a square shape, the plurality of openings 201d each having a square shape are provided (in a pattern of 3 rows×3 columns in the example of FIG. 16).

The openings 201c and 201d are each formed as the above-described mesh through which the powder material is to fall. The opening 201c is provided for forming the thick film parts 903a. The opening 201c has a low mesh count and a large opening size. The openings 201d are provided for forming the thin film parts 903b. The openings 201d have a large mesh count, and a small opening size. The opening 201c preferably has an opening size of 104 μm, a mesh count of 190/inch, a wire diameter of 29 μm, and an aperture ratio of 61.1%. The openings 201d preferably have an opening size of 55 μm, a mesh count of 302/inch, a wire diameter of 29 μm, and an aperture ratio of 42.9%. Note, however, that these values are merely examples.

As described above, the screen 201 used for forming the solid-electrolyte layer 903 is configured so that the amount of the powder material falling varies depending on parts of the screen. This (i) causes a large amount of powder material to fall through an outer periphery region of the opening 201c and through a region between adjacent openings 201d and (ii) causes a small amount of powder material to fall through the openings 201d. This, as illustrated in FIG. 15, causes the thick film parts 903a and the thin film parts 903b to be formed alternately in the solid-electrolyte layer 903.

Furthermore, the negative electrode layer 904 is formed on the solid-electrolyte layer 903. The negative electrode layer 904 is pressurized as necessary.

Then, the negative electrode current collector 905 is formed on the negative electrode layer 904. The negative electrode current collector 905 is subjected to pre-pressurization with a low pressure, and then subjected to main pressurization with a high pressure.

The all-solid-state battery 910 having a large area is thus prepared (laminated body forming step) so that (i) the positive electrode layer 902, the solid-electrolyte layer 903, and the negative electrode layer 904 are stacked on the positive electrode current collector 901 and (ii) the negative electrode current collector 905 is provided. The all-solid-state battery 910 includes the plurality of all-solid-state batteries 900.

Then, as illustrated in FIG. 15, the outer peripheral edges of the all-solid-state battery 910 are cut off at a cutoff part C having a square shape (cutoff step). In this cutoff step, the portion to be cut out can be divided into a plurality of portions according to dividing lines (for example, the dividing lines L1 as illustrated in FIG. 3D) with which the cutoff part C having a square shape is partitioned into a plurality of squares. This allows the plurality of all-solid-state batteries 900 to be obtained as divided laminated bodies.

In an all-solid-state battery, in general, a solid-electrolyte layer is preferably thin. Therefore, when a plurality of all-solid-state batteries are cut out, a cutout surface is deformed due to shearing force or the like, so that a positive electrode layer and a negative electrode layer may be short-circuited beyond the solid-electrolyte layer. In addition, if impact and/or vibration is/are applied to an all-solid-state battery as a product, there is a risk that a positive electrode layer and a negative electrode layer may be short-circuited at an edge where each layer easily collapses in, particularly, a laminated body, because the solid-electrolyte layer is thin.

In contrast, according to the all-solid-state battery 900 production method in accordance with Embodiment 4, the thick film parts 903a having a thickness greater than the average thickness of the solid-electrolyte layer 903 are formed at portions of the solid-electrolyte layer 903 where the cutoff part C and the dividing lines extend. In addition, the thin film parts 903b having a thickness less than the average thickness of the solid-electrolyte layer 903 are formed on the inner side of the thick film parts 903a formed at the outer peripheral parts of the solid-electrolyte layer 903.

According to this configuration, a plurality of all-solid-state batteries 900 are cut out from the all-solid-state battery 910 at the thick film parts 903a. It is therefore possible to prevent cutout surfaces from being deformed due to shearing. This reduces the possibility that the positive electrode layer and the negative electrode layer may be short-circuited beyond the solid-electrolyte layer. It is also possible to cause a large portion of the solid-electrolyte layer 903 to be thin.

In addition, the outer peripheral parts (thick film parts 903b) of the solid-electrolyte layer 903 of the all-solid-state battery 900 has a thickness greater than the thickness of the center parts (thin film parts 903b). Therefore, at the edges of the all-solid-state battery 900 where the laminated body 906 easily collapses, the solid-electrolyte layer 903 has the thick film parts 903a. This makes it possible to reduce the possibility that the positive electrode layer 902 and the negative electrode layer 904 may be short-circuited even if impact and/or vibration is/are applied to the all-solid-state battery 900 as a product.

It should be noted that when lithium ions move from the positive electrode to the negative electrode during charging of the all-solid-state battery 900, if the negative electrode is smaller than the positive electrode or if no negative electrode mixture layer is present in a region facing the positive electrode mixture layer, then the lithium ions have nowhere to go, so that electrodeposition (electrolyte deposition) occurs. The occurrence of the electrodeposition not only causes the battery characteristics to deteriorate, but also may cause a minute short circuit between the positive electrode and the negative electrode through a part where the electrodeposition is occurring.

In contrast, in any part on the flat surfaces of the all-solid-state battery 900, the amount of negative electrode active material is larger than the amount of positive electrode active material. This makes it possible to increase the amount of negative electrode active material facing the positive electrode active material. It is therefore possible to prevent the occurrence of electrodeposition.

Embodiment 5

Figure 17:
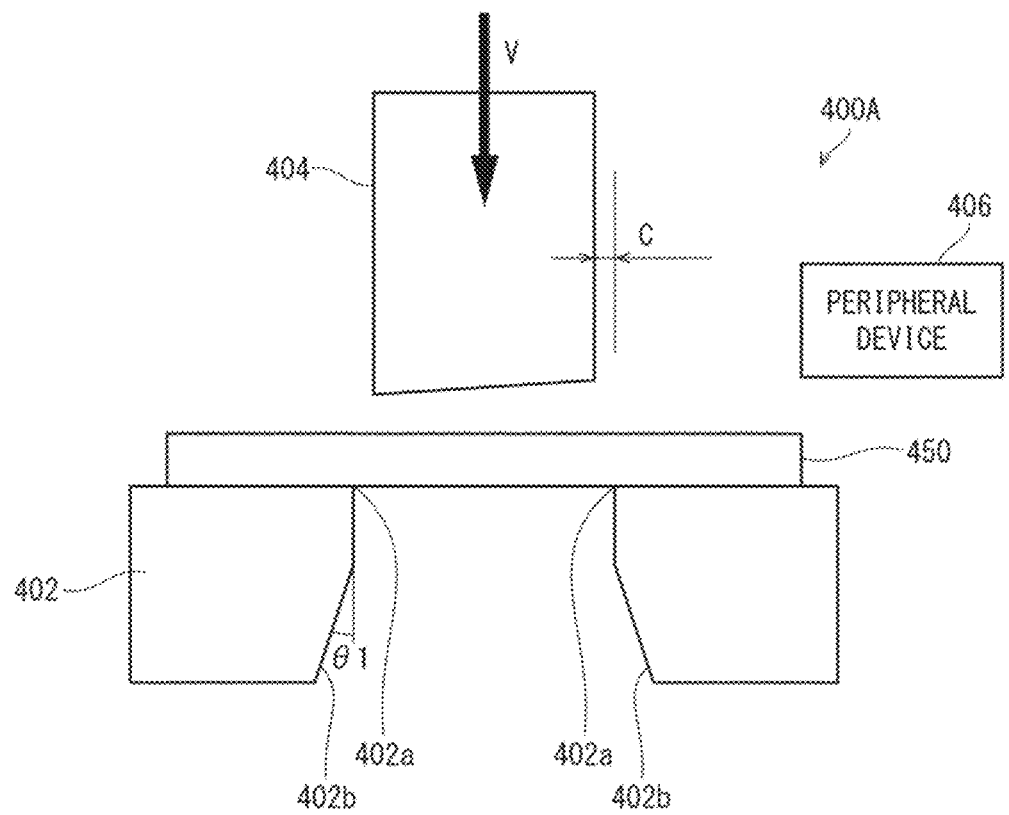
FIG. 17 is a view illustrating a precision punching device in accordance with Embodiment 5 of the present invention.
Figure 18:
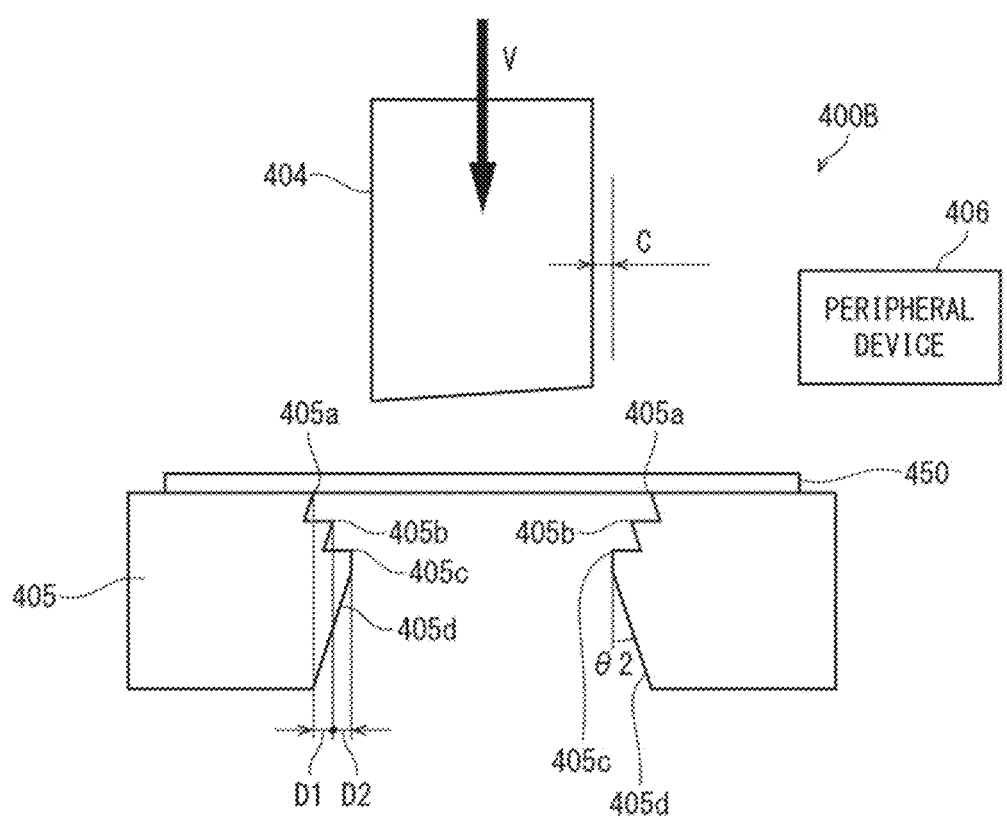
FIG. 18 is a view illustrating another precision punching device in accordance with Embodiment 5.
Figure 19:
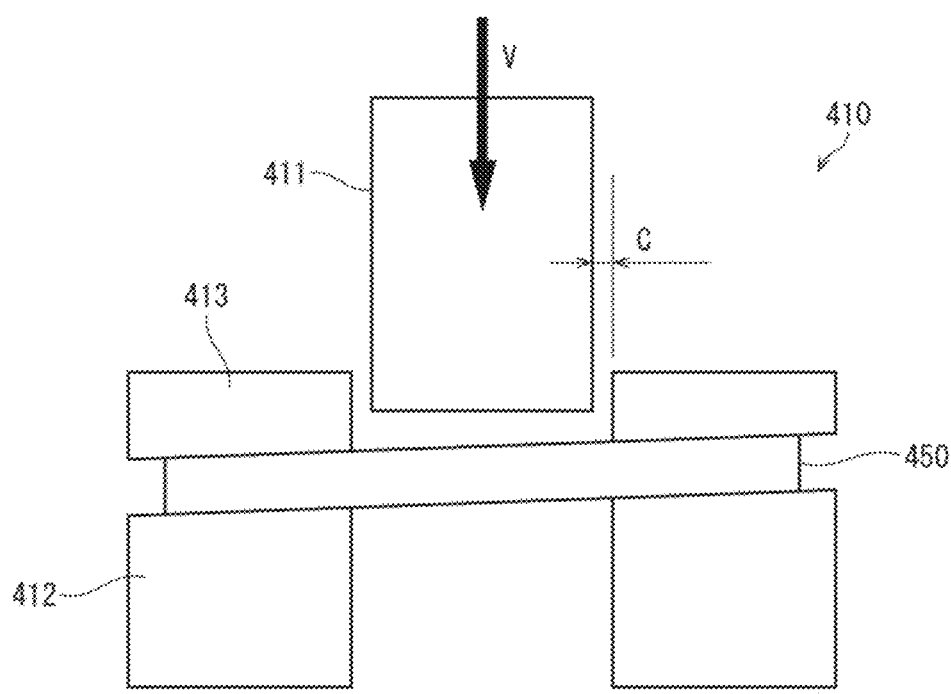
FIG. 19 is a view illustrating a precision punching device in accordance with Comparative Example of Embodiment 5.

The following description will discuss Embodiment 5 of the present invention with reference to FIGS. 17 through 19. Note that, in Embodiment 5, constituent elements having functions identical to those of constituent elements in Embodiment 1 are given identical reference signs and will not be described.

Embodiment 5 will discuss a precision punching device which is suitable for punching a brittle laminated body. A precision punching device using a conventional die will be described first.

FIG. 19 is a view illustrating a precision punching device 410 in accordance with Comparative Example of Embodiment 5.

As illustrated in FIG. 19, the conventional precision punching device 410 in accordance with Comparative Example of Embodiment 5 includes (i) a punch 411 and a die 412 which are provided so as to secure an appropriate clearance C and (ii) a presser board 413 configured to press a work material 450 onto the die 412. The precision punching device 410 cuts the work material 450, which has a plate-like shape and is provided between the punch 411 and the die 412, by lowering the punch 411 so as to cause the work material 450 to have shearing deformation in the vicinity of a region of the clearance C.

If the work material 450 is an ordinary metal material, optimization of the clearance C and fixing of the work material 450 with the presser board 413 are necessary in order to precisely punch the work material 450. In particular, whether or not the clearance C is optimized is considered to determine whether or not shearing work will be successful. If the clearance C is small, a punching cross section of the work material 450 is gouged. In contrast, if the clearance C is large, bending force (for deformation) becomes greater than shearing force (for cutting). This causes the occurrence of sagging and/or burrs. The presser board 413 is necessary for preventing deformation of the work material 450, such as curving toward the punch 411 side, before the work material 450 is cut by shearing.

In addition, in general, increasing the lowering speed (processing speed) of the punch 411 is considered to improve punching accuracy.

If the work material 450 is not a metal material but is made of a brittle material prepared by, for example, compressing a powder, it is impossible to properly punch the work material 450 with use of the conventional precision punching device 410 described above.

The brittle material breaks before being deformed by a large amount. Therefore, the clearance C is not as important, nor is it necessary to prevent the deformation of the work material 450 with use of the presser board 413. Rather, the presser board 413 prevents the work material 450 from being deformed gently. This causes a load to be applied only to a part of the work material 450 in the vicinity of the clearance C, so as to cause the part to collapse. In addition, increasing the processing speed causes the work material 450 to be broken by the impact of the punch 411.

In a case where the work material 450 made of a brittle material is to be punched, optimized punching conditions are thus different from those in the case of punching a work material 450 made of an ordinary metal material. Finding such optimized punching conditions is difficult.

Note that for improvement in punching accuracy and reduction in shearing resistance, (i) a punching surface of the punch 411 is formed so as to be perpendicular to a tool shaft (center axis of the punch 411) and (ii) the work material 450 is provided so as to be inclined on the die 412. Therefore, a placement surface (upper edge surface) of the die 412 on which the work material 450 is to be placed has a shearing angle. This makes it possible to convert a line load into a point load. Note that the shearing angle is provided not on the punch 411 side but on the die 412 side, because the shearing angle on the punch 411 side would result in deformation of the punched work material 450, such as backward curving.

The precision punching device in accordance with Embodiment 5 will be described next.

FIG. 17 is a view illustrating the precision punching device 400A in accordance with Embodiment 5.

As illustrated in FIG. 17, the precision punching device 400A (processing device) includes a punch 404 and a die 402.

The die 402 is also included in the precision punching device 400 in accordance with Embodiment 1. The die 402 has a blade edge 402a (blade) and a flank 402b on an inner peripheral wall which forms a space into which the punch 404 is to be inserted.

The punch 404 has a shearing angle so that a punching surface is inclined with respect to a tool shaft (center axis of the punch 404).

As in the case of the above-described precision punching device 410 in which the upper edge surface of the die 412 has the shearing angle instead of the punch 404 having the shearing angle, it is possible that the upper edge surface of the die 402 has the shearing angle. Alternatively, the die 402 and the punch 404 can both have shearing angles. In particular, the punch 404 preferably has a shearing angle. Specifically, regardless of blanking or piercing, a shearing angle is preferably provided between the upper edge surface of the die 402 and the punching surface (bottom edge surface having the blade) of the punch 404. This makes it possible to reduce a punching thrust and/or improve punching accuracy.

The clearance C between the die 402 and the punch 404 does not need to be set strictly, but can be set in an approximate range from several μm to several tens of μm.

The precision punching device 400A can include a peripheral device 406 accompanying the precision punching device 400A. The peripheral device 406 includes, for example, a removing mechanism, a cleaning mechanism, a conveying mechanism, and a positioning mechanism. The removing mechanism is a mechanism for scraping off a residue remaining on the punch 404. The cleaning mechanism is a mechanism for cleaning a fine powder which is generated due to the punching of the work material 450. The conveying mechanism is a mechanism for conveying the work material 450 to the die 402 and conveying, after the work material 450 is punched on the die 402, the work material 450 to a device for use in another step. The positioning mechanism is a mechanism for positioning the work material 450 at a certain processing position on the die 402.

Punching of the work material 450 with use of the precision punching device 400A thus configured will be described below.

As the laminated body 310, 320 punched out by the precision punching device 400 in Embodiment 1, for example, the work material 450 is a sheet-like material containing a brittle material.

The work material 450 is freely supported on the die 402. Alternatively, the work material 450 can be supported by a presser board (not illustrated) gently enough that deformation occurring during the punching is not prevented. Specifically, the die 402 holds the work material 450 in such a manner that deformation of the work material 450 occurring due to the punching by the punch 404 is not prevented.

The insertion speed V of the punch 404 is not more than 100 mm/sec, preferably a low speed of not more than 50 mm/sec, and more preferably a low speed of not more than 25 mm/sec.

During the punching, first, a portion having a size slightly larger than a desired punching size (product size) is punched out of the work material 450, and a portion having the desired punching size is further punched out of the portion thus punched out of. By thus performing the punching a plurality of times, it is possible to punch out a brittle material with accuracy.

Note that according to Embodiment 3, if an all-solid-state battery 800 having a desired shape is to be cut out as a product from the all-solid-state battery 810 containing a brittle material such as a powder material, the all-solid-state battery 800 is cut out while the rigidity of the outer peripheral edges to be cut off is lower than the rigidity of the cutout portion. This causes the outer peripheral edges to absorb the distortion occurring during the cutout, so that it is possible to prevent damage and defect in the product.

However, in some cases, it takes effort to make a difference in rigidity between a portion to be a product and a surrounding portion around such a portion. It is therefore realistic to cause the rigidity of the portion around the product portion to be less than the rigidity of the product portion by causing the width of a residue remaining around the product portion to be small.

Note, however, that the outer peripheral edges of the sheet containing the brittle material can easily be structurally unstable. Therefore, if a sheet having a size slightly larger (by approximately several mm) than the cutout shape of the product is produced, the outer peripheral edges of the product portion to be cut out also become unstable. Therefore, a stable product can be obtained by (i) forming a sheet having an area which is large to a certain extent and then (ii) cutting out only the center part of the sheet which is structurally stable.

Therefore, for example, in a case where a product is to be cut out by punching, it is necessary to carry out the punching step at least twice with use of the precision punching device 400A described above. Specifically, a sheet is punched out so as to be slightly larger than the product, and then a portion having a product shape is punched out of the sheet.

The description of the precision punching device in accordance with Embodiment 5 will be continued.

FIG. 18 is a view illustrating a precision punching device 400B which is another precision punching device in accordance with Embodiment 5.

As illustrated in FIG. 18, the precision punching device 400B (processing device) includes a punch 404 and a die 405.

The die 405 includes a plurality of blades on an inner peripheral wall, which are upper blade 405a, middle blade 405b, and lower blade 405c.

The upper blade 405a is provided on an upper edge surface which is positioned highest in the die 405. The middle blade 405b is provided below the upper blade 405a. The middle blade 405b protrudes further toward the center of the die 405 than the upper blade 405a by a protruding amount D1. The lower blade 405c is provided below the middle blade 405b. The lower blade 405c protrudes further toward the center of the die 405 than the middle blade 405b by a protruding amount D2. The protruding amounts D1 and D2 are each in a range of sub-mm to several tens of mm, and preferably set in a range of 0.3 mm to 0.5 mm.

According to such a structure, the opening area of the upper blade 405a is the largest, the opening area of the middle blade 405b is the second largest, and the opening area of the lower blade 405c is the smallest. In other words, the die 405 is formed so that the opening areas are largest at the upper edge surface and become smaller toward lower positions.

The shapes of the upper blade 405a, the middle blade 405b, and the lower blade 405c are basically similar. However, because the lower blade 405c is the blade to cut out a product portion, it is possible that (i) the lower blade 405c has a design (such as fine unevenness, fine waviness, and/or a rounded corner) for determining the outer shape of the product and (ii) neither the upper blade 405a nor the middle blade 405b has such a design.

At a position from below the lower blade 405c toward the lower edge of the inner peripheral wall of the die 405, a flank 405d is provided. A clearance angle θ2 forming the flank 405d is approximately several degrees as with the clearance angle θ1 of the die 402 of the precision punching device 400 described above. A small portion between the lower blade 405c and the upper edge of the flank 405d is formed as a parallel surface extending substantially parallel to the outer peripheral wall of the punch 404.

As in the case of the precision punching device 400A, the upper edge surface of the die 405 can have a shearing angle instead of the punch 404 having a shearing angle. Alternatively, the die 405 and the punch 404 can both have shearing angles. Specifically, regardless of blanking or piercing, a shearing angle is preferably provided between the upper edge surface of the die 405 and the punching surface of the punch 404. This makes it possible to reduce a punching thrust and/or improve punching accuracy.

The clearance C between the die 405 and the punch 404 is set substantially similarly (in a range from several μm to several tens of μm) to the case of the precision punching device 400A.

Note that the precision punching device 400B can also include a peripheral device 406 as in the case of the precision punching device 400A.

Punching of the work material 450 with use of the precision punching device 400B thus configured will be described below.

The work material 450 here is, for example, a sheet-like material containing a brittle material as with the work material 450 to be punched by the precision punching device 400A.

The work material 450 is freely supported on the die 405. Alternatively, the work material 450 can be supported by a presser board (not illustrated) gently enough that deformation occurring during the punching is not prevented.

By inserting the punch 404 into the die 405, first, the work material 450 is punched with the upper blade 405a. This causes a portion, which is two sizes larger than the product portion, to be cut out. By further pressing the punch 404 downwards, a portion, which is one size larger than the portion punched out by the upper blade 405a, is cut out. By further pressing the punch 404 downwards, a product portion is cut out from the portion punched out by the middle blade 405b.

During the punching, first, a portion having a size slightly larger than a desired punching size (product size) is punched out of the work material 450, and a portion having the desired punching size is further punched out of the portion thus punched out of. By thus performing the punching a plurality of times, it is possible to punch out a brittle material with accuracy.

As described above, with the precision punching device 400B, a sheet having a simple shape containing a brittle material such as a powder layer can be precisely punched out with use of a single device. In contrast, with the precision punching device 400A described above, the punch 404 and the die 402 corresponding to a punching size need to be prepared for performing the punching a plurality of times. In contrast, with the precision punching device 400B, it is only necessary to prepare one type of punch 404 and die 405. This reduces the cost for introducing a processing device, and, for example, makes it easy to manage a die.

Note that the precision punching devices 400A and 400B in accordance with Embodiment 5 can each be utilized for cutoff processing in Embodiments 3 and 4.

Additional Remarks

The present invention is not limited to the embodiments, but can be altered by a skilled person in the art within the scope of the claims. The present invention also encompasses, in its technical scope, any embodiment derived by combining technical means disclosed in differing embodiments.

REFERENCE SIGNS LIST 90, 101, 800, 900 All-solid-state battery
92 Negative electrode layer (second electrode layer)
93 Solid-electrolyte layer
94 Positive electrode layer (first electrode layer)
190 All-solid-state battery (laminated body)
310, 320 Laminated body
301 Support plate
302, 312 Positive electrode layer (first electrode layer)
303, 313 Solid-electrolyte layer
304, 314 Negative electrode layer (second electrode layer)
400A, 400B Precision punching device (processing device)
402, 405 Die
402a Blade edge (blade)
402b, 405d Flank
404 Punch
405a Upper blade (blade)
405b Middle blade (blade)
405c Lower blade (blade)
903 Solid-electrolyte layer (undulation membrane)
903a Thick film part

The invention claimed is:

1. An all-solid-state battery comprising:
a first electrode layer;
a second electrode layer having a polarity opposite of a polarity of the first electrode layer;
a solid-electrolyte layer disposed between the first electrode layer and the second electrode layer; and
a support plate on which the first electrode layer, the second electrode layer, and the solid-electrolyte layer are stacked,
at least one of the first electrode layer, the second electrode layer, and the solid-electrolyte layer being an undulation membrane having undulations, the undulation membrane including two or more thick film parts and a single thin film part thinner than the two or more thick film parts, the two or more thick film parts defining an outer periphery of the undulation membrane so as to surround the single thin film part, and
a laminated body including the first electrode layer, the second electrode layer, and the solid-electrolyte layer being formed so as to have a flat plate-like shape with a uniform thickness,
wherein peripheries of the first electrode layer, the second electrode layer and the solid-electrode layer align with each other, and the two or more thick film parts of the undulation membrane are disposed on an inner side of the aligned peripheries.

2. The all-solid-state battery according to claim 1, wherein the solid-electrolyte layer has a thickness that is greater at an outer peripheral part than at a portion further inside than the outer peripheral part.

3. A method of producing a plurality of all-solid-state battery units from an all-solid-state battery, the all-solid-state battery comprising: a first electrode layer; a second electrode layer having a polarity opposite of a polarity of the first electrode layer; a solid-electrolyte layer disposed between the first electrode layer and the second electrode layer; and a support plate on which the first electrode layer, the second electrode layer, and the solid-electrolyte layer are stacked, at least one of the first electrode layer, the second electrode layer, the solid-electrolyte layer being an undulation membrane having undulations, the undulation membrane including a thick film part and a thin film part thinner than the thick film part, the thick film part being arranged so as to surround the thin film part, and a laminated body including the first electrode layer, the second electrode layer, and the solid-electrolyte layer being formed so as to have a flat plate-like,
the method comprising the step of:
cutting out the plurality of all-solid-state battery units from the all-solid-state battery,
wherein the plurality of all-solid state battery units is cut off at the thick film part.

* * * * *